United States Patent
Tofte et al.

(10) Patent No.: US 10,535,103 B1
(45) Date of Patent: Jan. 14, 2020

(54) SYSTEMS AND METHODS OF UTILIZING UNMANNED VEHICLES TO DETECT INSURANCE CLAIM BUILDUP

(71) Applicant: STATE FARM MUTUAL AUTOMOBILE INSURANCE COMPANY, Bloomington, IL (US)

(72) Inventors: Nathan L. Tofte, Downs, IL (US); Timothy W. Ryan, Hudson, IL (US); Nathan W. Baumann, Bloomington, IL (US); Michael Shawn Jacob, Le Roy, IL (US); Joshua David Lillie, Bloomington, IL (US); Brian N. Harvey, Bloomington, IL (US); Roxane Lyons, Chenoa, IL (US); Rosemarie Geier Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 1026 days.

(21) Appl. No.: 14/858,699

(22) Filed: Sep. 18, 2015

Related U.S. Application Data

(60) Provisional application No. 62/209,963, filed on Aug. 26, 2015, provisional application No. 62/209,755, (Continued)

(51) Int. Cl.
  *G06Q 40/08* (2012.01)
(52) U.S. Cl.
  CPC .................... *G06Q 40/08* (2013.01)

(58) Field of Classification Search
  CPC .... G06Q 40/08; G06Q 20/4016; G06Q 40/00; G06Q 20/401; G06Q 10/0635; G06Q 50/163
  See application file for complete search history.

(56) References Cited

U.S. PATENT DOCUMENTS

| | | |
|---|---|---|
| 5,686,892 A | 11/1997 | Smith |
| 6,166,729 A | 12/2000 | Acosta et al. |

(Continued)

OTHER PUBLICATIONS

Frey, Thomas. "192 Future Uses for Flying Drones" Business Trends. Sep. 2, 2014; p. 14 (111. Insurance Adjuster Drones) https://futuristspeaker.com/business-trends/192-future-uses-for-flying-drones/ (Year: 2014).*

(Continued)

*Primary Examiner* — Elda G Milef
(74) *Attorney, Agent, or Firm* — Marshall, Gerstein & Borun LLP

(57) ABSTRACT

The present embodiments relate to detecting fraudulent insurance claims. According to certain aspects, a central monitoring server may receive and examine data detected by at least one unmanned vehicle and generate an estimated insurance claim for a loss event. The central monitoring server may then receive an actual insurance claim relating to the loss event, and may compare the estimated insurance claim to the actual insurance claim to identify potential buildup included in the actual insurance claim. If buildup is detected, the central monitoring server may then process the actual insurance claim accordingly based upon the potential buildup. As a result, claim monies may be paid to insureds that more accurately reflect actual losses resulting from the loss event, and insurance cost savings may be ultimately passed onto typical insurance customers.

22 Claims, 7 Drawing Sheets

Related U.S. Application Data filed on Aug. 25, 2015, provisional application No. 62/209,627, filed on Aug. 25, 2015, provisional application No. 62/208,201, filed on Aug. 21, 2015, provisional application No. 62/207,421, filed on Aug. 20, 2015, provisional application No. 62/207,127, filed on Aug. 19, 2015, provisional application No. 62/053,519, filed on Sep. 22, 2014.

(56) References Cited

U.S. PATENT DOCUMENTS

| | | | |
|---|---|---|---|
| 7,053,823 | B2 | 5/2006 | Cervinka et al. |
| 7,480,715 | B1 | 1/2009 | Barker et al. |
| 7,809,587 | B2 | 10/2010 | Dorai et al. |
| 7,889,931 | B2 | 2/2011 | Webb et al. |
| 7,912,738 | B1 | 3/2011 | Martin |
| 7,953,615 | B2 | 5/2011 | Aquila et al. |
| 8,019,629 | B1 | 9/2011 | Medina, III et al. |
| 8,095,391 | B2 | 1/2012 | Obora et al. |
| 8,239,220 | B2 | 8/2012 | Kidd et al. |
| 8,265,963 | B1 | 9/2012 | Hanson et al. |
| 8,346,578 | B1 * | 1/2013 | Hopkins, III .......... G06Q 40/00 382/100 |
| 8,374,957 | B1 | 2/2013 | Garcia et al. |
| 8,401,878 | B2 | 3/2013 | Stender et al. |
| 8,527,305 | B1 | 9/2013 | Hanson et al. |
| 8,537,338 | B1 | 9/2013 | Medasani et al. |
| 8,543,486 | B2 | 9/2013 | Donoho et al. |
| 8,630,820 | B2 | 1/2014 | Amis |
| 8,650,106 | B1 | 2/2014 | Hopkins, III |
| 8,700,434 | B1 | 4/2014 | DeLong et al. |
| 8,712,893 | B1 | 4/2014 | Brandmaier et al. |
| 8,756,085 | B1 | 6/2014 | Plummer et al. |
| 8,799,034 | B1 | 8/2014 | Brandmaier et al. |
| 8,818,572 | B1 | 8/2014 | Tofte et al. |
| 8,872,818 | B2 | 10/2014 | Freeman et al. |
| 9,019,092 | B1 | 4/2015 | Brandmaier et al. |
| 9,020,536 | B1 | 4/2015 | Crossno et al. |
| 9,082,015 | B2 | 7/2015 | Christopulos et al. |
| 9,129,355 | B1 | 9/2015 | Harvey et al. |
| 9,131,224 | B1 | 9/2015 | Freeman et al. |
| 9,505,494 | B1 | 11/2016 | Marlow et al. |
| 9,563,201 | B1 | 2/2017 | Tofte et al. |
| 9,612,598 | B2 | 4/2017 | Schultz et al. |
| 9,691,103 | B1 | 6/2017 | Hopkins, III |
| 9,754,325 | B1 | 9/2017 | Konrardy et al. |
| 9,792,656 | B1 | 10/2017 | Konrardy et al. |
| 9,824,397 | B1 | 11/2017 | Patel et al. |
| 9,846,915 | B2 | 12/2017 | Howe et al. |
| 9,852,487 | B1 | 12/2017 | Farnsworth et al. |
| 9,870,609 | B2 | 1/2018 | Kompalli et al. |
| 9,875,509 | B1 | 1/2018 | Harvey et al. |
| 9,894,327 | B1 | 2/2018 | Jacob |
| 9,928,553 | B1 | 3/2018 | Harvey et al. |
| 9,972,054 | B1 | 5/2018 | Konrardy et al. |
| 10,102,584 | B1 | 10/2018 | Devereaux et al. |
| 10,163,162 | B1 | 12/2018 | Devereaux et al. |
| 2002/0002475 | A1 * | 1/2002 | Freedman ............. G06Q 40/02 705/4 |
| 2002/0007225 | A1 | 1/2002 | Costello et al. |
| 2002/0055861 | A1 | 5/2002 | King et al. |
| 2003/0154111 | A1 | 8/2003 | Dutra et al. |
| 2004/0088198 | A1 | 5/2004 | Childress et al. |
| 2004/0243423 | A1 | 12/2004 | Rix et al. |
| 2005/0080649 | A1 | 4/2005 | Alvarez et al. |
| 2005/0128074 | A1 | 6/2005 | Culpepper et al. |
| 2006/0071783 | A1 | 4/2006 | Culpepper et al. |
| 2008/0091490 | A1 | 4/2008 | Abrahams et al. |
| 2008/0224854 | A1 | 9/2008 | Furey et al. |
| 2008/0255887 | A1 | 10/2008 | Gruter |
| 2009/0002364 | A1 | 1/2009 | Witte, II |
| 2009/0027253 | A1 | 1/2009 | van Tooren et al. |
| 2009/0055226 | A1 | 2/2009 | Tritz et al. |
| 2009/0138290 | A1 | 5/2009 | Holden |
| 2009/0157437 | A1 | 6/2009 | Becerra et al. |
| 2009/0265193 | A1 * | 10/2009 | Collins .............. G06Q 30/0185 705/4 |
| 2010/0012769 | A1 | 1/2010 | Alber et al. |
| 2010/0215212 | A1 | 8/2010 | Flakes, Jr. |
| 2010/0250022 | A1 | 9/2010 | Hines et al. |
| 2010/0302359 | A1 | 12/2010 | Adams et al. |
| 2011/0130636 | A1 | 6/2011 | Daniel et al. |
| 2011/0137443 | A1 | 6/2011 | Farahani |
| 2011/0161118 | A1 | 6/2011 | Borden et al. |
| 2012/0033821 | A1 | 2/2012 | Ohta et al. |
| 2012/0071998 | A1 | 3/2012 | Davies et al. |
| 2012/0140041 | A1 | 6/2012 | Burgunder et al. |
| 2012/0210853 | A1 | 8/2012 | Abershitz et al. |
| 2012/0250010 | A1 | 10/2012 | Hannay |
| 2012/0303336 | A1 | 11/2012 | Becker et al. |
| 2013/0033381 | A1 | 2/2013 | Breed |
| 2013/0033851 | A1 | 2/2013 | Wang |
| 2013/0226624 | A1 | 8/2013 | Blessman et al. |
| 2014/0019166 | A1 * | 1/2014 | Swanson ................ G06Q 40/08 705/4 |
| 2014/0058763 | A1 * | 2/2014 | Zizzamia ............... G06Q 40/08 705/4 |
| 2014/0100889 | A1 * | 4/2014 | Tofte ...................... G06Q 40/08 705/4 |
| 2014/0163852 | A1 | 6/2014 | Borri et al. |
| 2014/0244078 | A1 | 8/2014 | Downey et al. |
| 2014/0257862 | A1 | 9/2014 | Billman et al. |
| 2014/0316614 | A1 | 10/2014 | Newman |
| 2014/0320651 | A1 | 10/2014 | McClatchie et al. |
| 2014/0324405 | A1 | 10/2014 | Plummer et al. |
| 2015/0019267 | A1 | 1/2015 | Prieto et al. |
| 2015/0020558 | A1 | 1/2015 | Williams |
| 2015/0046194 | A1 | 2/2015 | Waddell et al. |
| 2015/0254738 | A1 | 9/2015 | Wright, III et al. |
| 2015/0348204 | A1 | 12/2015 | Daues |
| 2015/0363717 | A1 * | 12/2015 | Lim ................... G06Q 10/0633 705/4 |
| 2016/0063642 | A1 * | 3/2016 | Luciani ................ G06Q 40/08 705/4 |
| 2016/0071217 | A1 | 3/2016 | Edwards et al. |
| 2016/0088286 | A1 | 3/2016 | Forsythe et al. |
| 2016/0111006 | A1 | 4/2016 | Srivastava et al. |
| 2016/0189303 | A1 | 6/2016 | Fuchs |
| 2017/0210451 | A1 | 7/2017 | Oh |
| 2017/0352100 | A1 | 12/2017 | Shreve et al. |

OTHER PUBLICATIONS

How Do Body Shop Estimates Affect Car Insurance Claims?. Car Insurance Quotes.com. Aug. 19, 2013 (2 pages). (Year: 2013).*
Costonis, Michael A. "Better Insurer Service Can Reduce Consumer Tolerance Schemes." Journal of Insurance Fraud in America. Fall 2011. (Year: 2011).*
U.S. Appl. No. 14/510,307, filed Oct. 9, 2014.
U.S. Appl. No. 14/510,492, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/824,859, filed Aug. 12, 2015.
U.S. Appl. No. 14/858,034, filed Sep. 18, 2015.
U.S. Appl. No. 14/858,038, filed Sep. 18, 2015.
U.S. Appl. No. 14/858,052, filed Sep. 18, 2015.
U.S. Appl. No. 14/858,058, filed Sep. 18, 2015.
U.S. Appl. No. 14/858,073, filed Sep. 18, 2015.
U.S. Appl. No. 14/858,075, filed Sep. 18, 2015.
U.S. Appl. No. 14/858,076, filed Sep. 18, 2015.
Office Action issued in U.S. Appl. No. 14/858,034 dated Apr. 3, 2018.
Office Action issued in U.S. Appl. No. 14/858,038 dated Mar. 29, 2018.
Office Action issued in U.S. Appl. No. 14/858,073 dated Apr. 20, 2018.
Office Action issued in U.S. Appl. No. 14/858,076 dated Dec. 28, 2017.
Office Action issued in U.S. Appl. No. 14/858,076 dated Apr. 20, 2018.

(56) References Cited

OTHER PUBLICATIONS

Office Action issued in U.S. Appl. No. 14/858,052 dated Jun. 15, 2018.
Office Action issued in U.S. Appl. No. 16/045,851 dated Sep. 4, 2018.
Office Action issued in U.S. Appl. No. 14/858,034 dated Jul. 26, 2018.
Office Action issued in U.S. Appl. No. 14/858,034 dated Dec. 14, 2018.
Sorcher, Sara, "What Drones Can Do for You," National Journal, Washington, Apr. 11, 2013, pp. 1-4.
Office Action issued in U.S. Appl. No. 14/858,075 dated Jan. 25, 2019.
Office Action issued in U.S. Appl. No. 14/858,052 dated Nov. 14, 2018.
Frey, Thomas, "192 Future Uses for Flying Drones," Business Trends. (Sep. 2, 2014).
"How do Body Shop Estimates Affect Car Insurance Claims?" CarInsuranceQuotes.com (Aug. 19, 2013).
Costonis, Michael, "Better Insurer Service Can Reduce Consumer Tolerance Schemes," Journal of Insurance Fraud in America (Fall 2011).
Office Action issued in U.S. Appl. No. 14/858,699 dated Dec. 31, 2018.
Office Action issued in U.S. Appl. No. 14/858,058 dated Jan. 11, 2019.

\* cited by examiner

INVESTIGATION TEAM

List of Flagged Claims (602)
- CLAIM # 12345 (604)
- CLAIM # 12346 (606)
- CLAIM # 12347
- ...

Next Steps for Processing (608)
- 📞 CONTACT CUSTOMER (610)
- 📋 UPDATE SUBMITTED CLAIM
- ✓ UPDATE SUBMITTED CLAIM
- ✗ UPDATE SUBMITTED CLAIM

FLAGGED CLAIM SUMMARY (612)

Reasons Flagged (614) | Environment Data (630)

| REASONS FLAGGED (628) | EXPECTED ENTRY | SUBMITTED ENTRY (632) |
|---|---|---|
| 1. TOTAL CLAIM AMOUNT | $1,000 | $8,000 |
| 2. REPAIR TOTAL | $1,000 | $2,000 |
| 3. TYPE OF REPAIR | REPLACE BUMPER | REPLACE BUMPER & HOOD |
| 4. NUMBER OF PASSENGERS | 2 | 4 |
| 5. TYPE OF MEDICAL TREATMENT | NONE | RECURRING BACK PAIN/ CHIROPRACTOR |
| 6. MEDICAL TREATMENT TOTAL | $0 | $6,000 |

SUBMITTED CLAIM (618) / ESTIMATED CLAIM (622)

- CLAIM #: _____
- CLAIM TOTAL: _____

VEHICLE INFORMATION (624)
- MAKE _____ MODEL _____
- YEAR _____ TYPE _____
- DAMAGE _____
- REPAIR(S) _____
- REPAIR TOTAL _____

PASSENGER INFORMATION (626)
- NUMBER OF PASSENGERS _____
- INJURIES _____
- MEDICAL TREATMENT _____
- MEDICAL TREATMENT TOTAL _____

FIG. 6A

SYSTEMS AND METHODS OF UTILIZING UNMANNED VEHICLES TO DETECT INSURANCE CLAIM BUILDUP

CROSS REFERENCE TO RELATED APPLICATIONS

This application claims the benefit of (1) U.S. Provisional Patent Application No. 62/053,519, entitled "Method of Implementing Unmanned Aerial Vehicles (UAVs)," filed Sep. 22, 2014, (2) U.S. Provisional Patent Application No. 62/209,963, entitled "Disaster Damage Analysis and Loss Mitigation Implementing Unmanned Aerial Vehicles (UAVs)," filed Aug. 26, 2015, (3) U.S. Provisional Patent Application No. 62/207,421 entitled "Insurance Underwriting and Re-Underwriting Implementing Unmanned Aerial Vehicles (UAVs)," filed Aug. 20, 2015, (4) U.S. Provisional Patent Application No. 62/207,127 entitled "Accident Reconstruction Implementing Unmanned Aerial Vehicles (UAVs)," filed Aug. 19, 2015, (5) U.S. Provisional Patent Application No. 62/209,755 entitled "Systems and Methods of Utilizing Unmanned Aerial Vehicles to Detect Insurance Claim Buildup," filed Aug. 25, 2015, (6) U.S. Provisional Patent Application No. 62/209,627 entitled "Systems and Methods for Using Data Collected from Unmanned Aerial Vehicles to Pre-Generate Claims for Insured Approval," filed Aug. 25, 2015, and (7) U.S. Provisional Patent Application No. 62/208,201 entitled "Loss Mitigation Implementing Unmanned Aerial Vehicles (UAVs)," filed Aug. 21, 2015, the disclosure of each of which is hereby expressly incorporated by reference herein in its entirety.

This application is also related to U.S. Nonprovisional patent application Ser. No. 14/824,859 entitled "Accident Fault Determination Implementing Unmanned Aerial Vehicles (UAVs)," filed Aug. 12, 2015, the disclosure of which is hereby expressly incorporated by reference herein in its entirety.

FIELD OF DISCLOSURE

The present disclosure generally relates to detecting insurance claim buildup using data detected by at least one unmanned vehicle. More particularly, the present disclosure relates to systems and methods for generating an estimated insurance claim for a loss event and comparing the estimated insurance claim to an actual insurance claim received for the loss event in order to identify potential insurance claim buildup.

BACKGROUND

After a loss event, an individual who owns an insured asset such as a vehicle may file an insurance claim with their insurance company. The insurance claim typically specifies a monetary amount that the claimant individual claims represents an amount of damage incurred by the insured asset and/or any individuals associated with the loss event. However, claim buildup may occur when the claimant individual submits an insurance claim that contains an inflated monetary amount that includes damage not associated with the loss event. For example, the individual may submit an insurance claim that indicates additional or unrelated pain clinic treatments, the costs of which inflate the total monetary amount included in the insurance claim.

Buildup is estimated to result in billions of dollars in excess payments to customers and also raises insurance costs for all customers. Consequently, it is beneficial for insurance companies to reliably detect buildup in submitted insurance claims to avoid making excess payments and reduce fraud.

BRIEF SUMMARY

The present embodiments may relate to, inter alia, using at least one unmanned vehicle to obtain data relating to a loss event. In one aspect, the unmanned vehicle may be an unmanned aerial vehicle (commonly known as a "drone," or UAV). The loss event data may be used to predict the extent of damage from a loss event, such as an expected total claim amount for a loss event. The prediction may consider several aspects of an insurance claim, such as an estimated repair cost for the damage to an insured asset and/or an estimated total medical treatment for the passengers. To estimate these figures, systems and methods may analyze data captured by the unmanned vehicle to predict the type of insured asset that was damaged (e.g., the type of vehicle), the number of passengers, the type of repairs required and/or the type of medical treatment required.

For instance, the data detected by the at least one unmanned vehicle or drone may be video data and the loss event may be a collision between two vehicles. The video data may be analyzed to determine that the vehicles are sedans and the expected number of passengers is two per vehicle. The extent of damage to the vehicles may be estimated by analyzing video or image data for depictions of the vehicles before and after the collision. The damage may also be estimated by analyzing any telematics data of the vehicles before and during the collision. The at least one unmanned vehicle may directly capture the telematics. Additionally, a server or similar component may calculate the telematics based upon one or more depictions of the loss event. The types of repairs required may be estimated based upon the estimated damage or may be based upon historic data associated with previously-submitted claims. For example, if the loss event is a low-speed collision with minimal visible damage, the repairs may be estimated by examining previous low-speed collisions. However, if the loss event is a high-speed collision with visible damage, the repairs may be estimated by looking at previous high-speed collisions. In that way, the repairs may include potential internal damage to the vehicle (e.g., issues with the frame or transmission) that may not be directly visible in video or image data. Similarly, the medical treatment may be estimated by comparing the severity of the collision with previously-submitted claims. Therefore, a low-speed collision may have minimal estimated treatment and a high-speed collision may have an estimated medical treatment that may include a hospital stay.

A server or similar component may calculate an estimated insurance claim based upon these parameters. The estimated insurance claim may include information on one or more of these parameters and may include an estimated total claim amount. A claimant individual may submit an actual insurance claim associated with one or more of the insured assets involved in the loss event. Once the server receives the actual insurance claim, the server may compare the actual insurance claim to the estimated insurance claim. This comparison may include comparing one or more fields of the estimated insurance claim (e.g., estimated total claim amount, estimated medical treatment total and/or estimated repair total) with the corresponding fields on the actual insurance claim (e.g., actual total claim amount, actual medical treatment total and/or actual repair total). If the fields of the respective insurance claims differ by a predetermined threshold, then the server may deem that there is potential claim buildup included in the actual insurance claim. The server may then process the actual insurance claim based upon the potential claim buildup, which may include forwarding the actual insurance claim to a fraud investigations team or adjusting the total claim amount and forwarding the adjusted claim to the claimant for review.

A system and method of implementing unmanned vehicles or drones to detect insurance claim buildup may be provided. In particular, the method of implementing unmanned vehicles to detect claim buildup may include receiving, at a server associated with an insurance provider, data detected by at least one unmanned vehicle, the data indicating a loss event involving at least one of an individual and an insured asset; and examining, by a processor, the data detected by the at least one unmanned vehicle to calculate an estimated amount of damage resulting from the loss event. The method may further include generating, by the processor, an estimated insurance claim for the loss event based upon the estimated amount of damage resulting from the loss event; receiving, at the server, an actual insurance claim related to the loss event and submitted by a claimant individual; and/or comparing, by the processor, the estimated insurance claim to the actual insurance claim to identify potential buildup included in the actual insurance claim. The method may further include processing the actual insurance claim based upon the potential buildup. As a result, fraudulent claims may be reduced, and/or insurance cost savings may ultimately be provided to the average consumer. The method may include additional, less, or alternate actions, including those discussed elsewhere herein, and/or may be implemented via one or more local or remote processors.

In another example of the present disclosure, a system for implementing unmanned vehicles, which may include unmanned aerial vehicles or drones, to detect insurance claim buildup may be provided. The system may include a transceiver adapted to interface with and receive data detected by at least one unmanned vehicle, a memory adapted to store non-transitory computer executable instructions, and a processor adapted to interface with the transceiver and the memory. The processor may be configured to execute the non-transitory computer executable instructions to cause the process to receive, via the transceiver, data detected by the at least one unmanned vehicle, the data indicating a loss event involving at least one of an individual and an insured asset and examine the data detected by the at least one unmanned vehicle to calculate an estimated amount of damage resulting from the loss event. The processor may also be configured to generate an estimated insurance claim for the loss event based upon the estimated amount of damage resulting from the loss event, receive an actual insurance claim related to the loss event and submitted by a claimant individual, compare the estimated insurance claim to the actual insurance claim to identify potential buildup included in the actual insurance claim, and/or process the actual insurance claim based upon the potential buildup. As a result, more accurate insurance claim amounts may ultimately be paid out to insureds, and insurance cost savings may be provided to an average consumer. The system may include additional, less, or alternate functionality, including that discussed elsewhere herein.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIGS. 6A and 6B depict an exemplary user interface associated with processing an actual insurance claim flagged for potential buildup by a fraud investigation team associated with an insurance company, in accordance with some embodiments.

DETAILED DESCRIPTION

Figure 1:
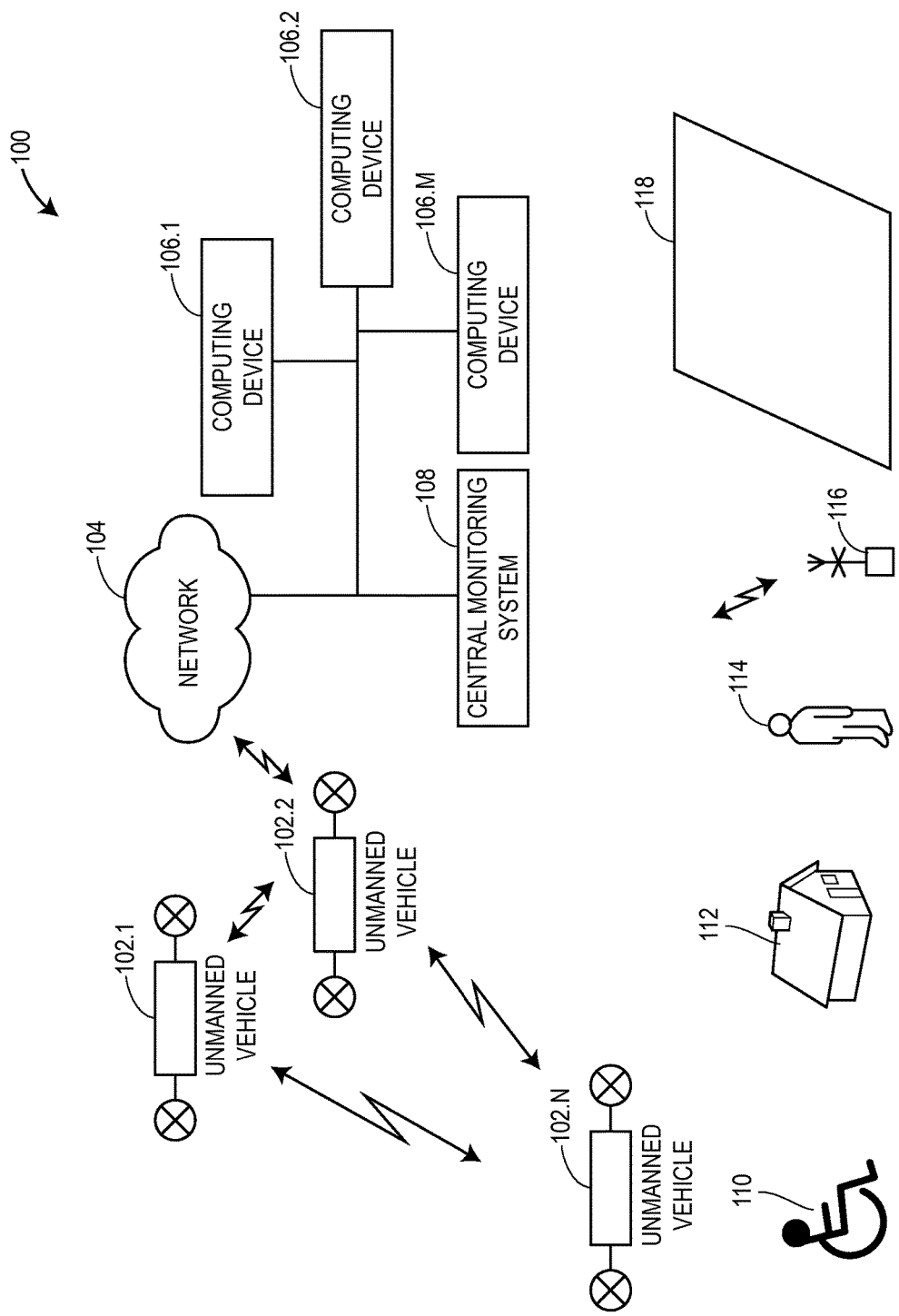
FIG. 1 depicts an exemplary block diagram of an unmanned vehicle system in accordance with some embodiments.

The novel methods and systems disclosed herein generally relate to techniques and implementations for detecting insurance claim buildup using data detected by at least one unmanned vehicle in the vicinity of a loss event. A central monitoring server may analyze the data to estimate the extent of damage to an insured asset during the loss event, and compare this estimate to an actual, submitted insurance claim to identify potential insurance claim buildup included in the actual insurance claim. Accordingly, an insurance provider may use these methods and systems to help detect and protect against insurance fraud, and/or reduce unnecessary expenses to facilitate passing insurance cost savings onto consumers.

The present embodiments may offer several advantages and benefits over conventional methods of identifying insurance fraud. Existing fraud identification procedures implemented by insurance providers rely exclusively on information included in the claim itself, such as a collision summary from a police report or a description from the claimant individual. Although some insurance providers may analyze previously-submitted insurance claims, these insurance providers may be still limited to information included in the insurance claim itself. In addition, because the existing systems rely on claimant individuals to submit the insurance claim, insurance providers cannot initiate any fraud analysis prior to the claimant individuals submitting the claim. The systems and methods disclosed herein, therefore, may enable an insurance provider to utilize data captured by an unmanned vehicle when analyzing an actual insurance claim to identify potential buildup included in the actual insurance claim, and to initiate the fraud analysis before a claimant individual submits the actual insurance claim to the insurance provider.

A central monitoring server may receive data (e.g., video data, image data or audio data) detected by at least one unmanned vehicle, where the data corresponds to a loss event. Such a loss event may include a vehicle collision, damage to a home, or damage to any other insured asset. The central monitoring server may then use the data detected by the unmanned vehicle to estimate an insurance claim. The central monitoring system may base the prediction on several sources of monetary damage, such as an estimated repair cost for an insured asset and estimated total medical treatment for the passengers. To estimate these sources of monetary damage, the central monitoring system may use the data captured by the at least one unmanned vehicle to predict the type of insured asset that was damaged (e.g., the type of vehicle), the number of passengers, the type of repairs required, and/or the type of medical treatment required.

The central monitoring server may then calculate an estimated insurance claim based upon the estimated sources of monetary damage. The estimated insurance claim may identify the estimated sources of monetary damage and may include an estimated total claim amount. A claimant individual may submit an actual insurance claim associated with one or more of the insured assets involved in the loss event. The central monitoring server may then compare the actual insurance claim with the estimated insurance claim in order to identify potential buildup. In this way, the present system and methods enable an insurance company to utilize information not previously available when identifying insurance claim buildup, potentially improving the accuracy of identifying insurance claim buildup. Further, the analysis may begin prior to the submission of the actual insurance claim, potentially enabling quicker processing of submitted insurance claims and identification of insurance claim buildup.

The systems and methods discussed herein therefore address a challenge that is particular to insurance fraud identification. In particular, the challenge relates to the difficulty in determining the occurrence of insurance claim buildup. This is particularly apparent when an insurance company merely has access to the information submitted by a claimant individual in an insurance claim, as that claimant individual who may be engaging in insurance claim buildup. In conventional circumstances, an insurance company may be limited to the information included in the claim and information from previously-submitted claims. In contrast, the present systems and methods may enable insurance companies to receive information from other sources, such as unmanned vehicles, calculate an estimated insurance claim based upon the received information, and/or compare the estimated insurance claim to an actual, submitted insurance claim to identify potential claim buildup. Therefore, because the present systems and methods employ the receiving, calculating and comparing using data detected at the scene of a loss event, the systems and methods are necessarily rooted in computer technology in order to overcome the noted shortcomings that specifically arise in the realm of insurance fraud identification.

Similarly, the systems and methods provide improvements in a technical field, namely, data collection and analysis. Instead of the systems and methods merely being performed by hardware components using basic functions, the systems and methods employ complex steps that go beyond the mere concept of simply retrieving and combining data using a computer. In particular, the hardware components dynamically generate an estimated insurance claim that may include several different calculated quantities. The selection and calculation of these quantities, as well as the generation of the estimated insurance claim itself, may be facilitated using data received from a remote unmanned vehicle that is in proximity to a scene of a loss event. This combination of elements further imposes meaningful limits in that the operations are applied to improve data collection and compiling by detecting how and when certain actions need to be initiated, and facilitating the actions in a meaningful and effective way.

According to implementations, the present systems and methods may support a dynamic, real-time or near-real-time analysis of any data detected by the unmanned vehicle. In particular, the unmanned vehicle may gather and compile and transmit data associated with a loss event to a remote insurance provider in real-time or near real-time. Further, the remote insurance provider may analyze the received data in real-time or near real-time, and may thus dynamically generate an estimated insurance claim including various calculation estimates associated with damage indicated in the received data. Accordingly, the remote insurance provider may compare the estimated insurance claim to any actual insurance claim as soon as a claimant customer submits the actual insurance claim, and may accordingly process the actual insurance claim in real-time or near-real time.

I. System Overview

FIG. 1 illustrates an exemplary block diagram of an unmanned vehicle system 100. The unmanned vehicle system 100 may include N number of unmanned vehicles 102.1-102.N, a network 104, M number of computing devices 106.1-106.M, and a central monitoring server 108. The unmanned vehicle system 100 may also include a disabled person 110, a house 112, a person 114, a beacon 116, and a geographic location 118. FIG. 1 illustrates various components for purposes of illustrating the various embodiments described throughout this disclosure. However, those of ordinary skill in the relevant art(s) will appreciate that some embodiments may use one or more components while not utilizing others. The unmanned vehicle system 100 may include additional, fewer, or alternate components, including those discussed elsewhere herein.

In various aspects, any suitable number of unmanned vehicles 102 may communicate with one another and/or with network 104. One or more of unmanned vehicles 102.1-102.N may receive commands from other unmanned vehicles 102 and/or via network 104, process these commands, and execute one or more actions based upon these received commands. Unmanned vehicles 102 may also transmit data to other unmanned vehicles 102 and/or to network 104. In the case in which this data represents commands to be execute by other unmanned vehicles 102, then the unmanned vehicles may be configured to execute one or more actions based upon data received from another unmanned vehicles 102.

As will further discussed below, one or more unmanned vehicles 102 may execute any suitable action based upon a particular application and/or commands transmitted to one or more of unmanned vehicles 102. For example, one or more of unmanned vehicles 102 may render assistance to disabled person 110, take aerial pictures or other sensory data of house 112, deploy beacon 116 near person 114, render assistance to person 114, navigate to location 118 to perform various actions, etc. The unmanned vehicles 102.1-102.N are depicted as UAVs, but it should be appreciated that the unmanned vehicles 102 may be implemented as any combination of aerial or non-aerial unmanned vehicles and not depart from the scope of this disclosure. For example, the unmanned vehicles 102 may be implemented as one or more quadracopters, helicopters, airplanes, flying wings, RC cars, autonomous vehicles, "drones," robots, robotic ground vehicles with wheels, etc. and may utilize any suitable type of navigation and/or maneuvering control, such as collision-avoidance systems, detect-and-avoid systems, etc.

Network 104 may include any appropriate combination of wired and/or wireless communication networks. For example, network 104 may include any combination of satellites, a local area network (LAN), a metropolitan area network (MAN), a wide area network (WAN), public switched telephone networks (PSTN), etc., and may facilitate a connection to the Internet. To provide further examples, network 104 may include wired telephone and cable hardware, satellite, cellular phone communication networks, etc.

Network 104 may facilitate communications between unmanned vehicles 102 and one or more of computing devices 106 and/or central monitoring server 108. Network 104 is illustrated as a single network for purposes of brevity, but may represent more than one type of network and/or an aggregation of several networks. For example, one or more of unmanned vehicles 102 may communicate with satellites via network 104 to supplement lost communications (not shown) and/or communicate with central monitoring server 108 via a cellular network system.

Computing devices 106.1-106.M may be implemented as any suitable device to communicate with, command, and/or control unmanned vehicles 102.1-102.N. One or more of computing devices 106.1-106.M may be implemented, for example, as a personal computer or a mobile device, such as a laptop, a smartphone, a tablet computer, a wearable electronic device, phablet, netbook, notebook, smart watch, smart glasses, etc.

Central monitoring server 108 may be implemented as any suitable device configured to communicate with, command, and/or control unmanned vehicles 102.1-102.N. Central monitoring server 108 may be implemented, for example, as a personal computer or mobile device, such as a laptop, a smartphone, a tablet computer, netbook, notebook, phablet, a wearable electronic device, smart glasses, etc. In one aspect, central monitoring server 108 may be implemented as a specialized component utilized in conjunction with one or more specific tasks performed by the unmanned vehicles 102. For example, central monitoring server 108 may be part of an insurer computing system, and as such may access insurer databases, algorithms, applications, remote servers, remote processors, etc., as needed to perform insurance-related functions using data collected from one or more of the unmanned vehicles 102. To provide another example, central monitoring server 108 may be included as part of third party roadside assistance system, a system used by emergency response personnel, a traffic system, a weather system, a communication system (e.g., a part of a base station providing cellular communications), a security monitoring system, etc.

In various aspects, one or more of the unmanned vehicles 102, one or more of computing devices 106, and/or central monitoring server 108 may share one or more functions such that either of the unmanned vehicles 102, computing devices 106, and/or central monitoring server 108 may perform any portion (or all) of the functions otherwise performed by the other devices. As will be appreciated by those of ordinary skill in the relevant art(s), functions may be performed by either the unmanned vehicles 102, computing devices 106, and/or central monitoring server 108 working in concert with one another. For example, as will be further discussed herein, one or more of the unmanned vehicles 102 may analyze sensory data itself or transmit the sensory data back to computing devices 106 and/or central monitoring server 108 for further analysis and/or to offload these tasks. The unmanned vehicle system 100 may include additional, fewer, or alternate functionality or actions, including those discussed elsewhere herein.

II. Unmanned Vehicle Overview

Figure 2:
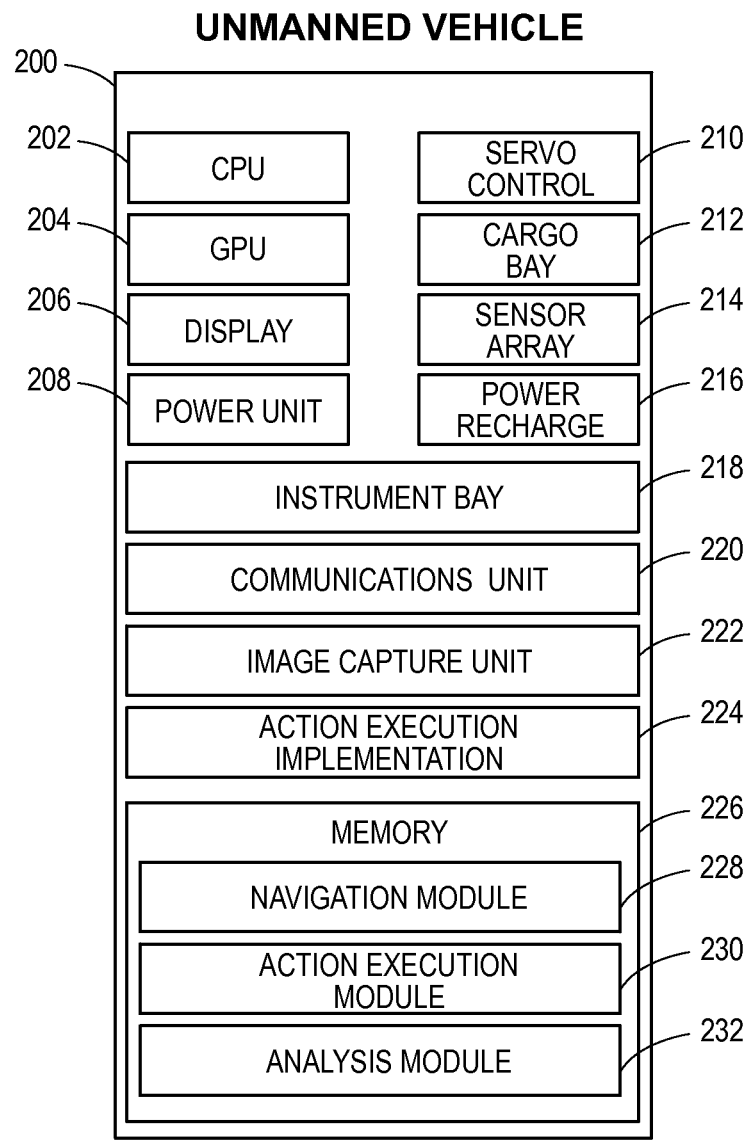
FIG. 2 depicts an exemplary block diagram of an unmanned vehicle in accordance with some embodiments.

FIG. 2 illustrates an exemplary block diagram of an unmanned vehicle 200. The unmanned vehicle 200 may include a CPU 202, a GPU 204, a display 206, a power unit 208, a servo control unit 210, a cargo bay 212, a sensor array 214, a charging unit 216, an instrument bay 218, a communications unit 220, an image capture unit 222, an action execution implementation unit 224, and a memory 226. In one aspect, the unmanned vehicle 200 is an implementation of one of the unmanned vehicles 102.1-102.N, as shown in FIG. 1, and may be a ground-based or aerial drone.

CPU 202 and/or GPU 204 may be configured to communicate with memory 226 to store to and read data from memory 226. Memory 226 may be a computer-readable non-transitory storage device and may include any suitable combination of volatile (e.g., a random access memory (RAM), or a non-volatile memory (e.g., battery-backed RAM, FLASH, etc.)). Memory 226 may be configured to store instructions executable on CPU 202 and/or GPU 204. These instructions may include machine readable instructions that, when executed by CPU 202 and/or GPU 204, cause CPU 202 and/or GPU 204 to perform various acts.

Display 206 may be configured to display one or more images, messages, instructions, etc., in response to data received from CPU 202 and/or GPU 204. Display 206 may be implemented as any suitable type of display. For example, display 206 may be mounted to the outer surface of the unmanned vehicle 200 such that messages displayed on display 206 are visible to persons observing UAV 200 from any suitable distance. For example, as will be further discussed below, display 206 may include traffic information, advertising information, safety instructions, etc.

Power unit 208 may be configured to act as a power source for the unmanned vehicle 200. Power unit 208 may be implemented as any suitable type of power source that facilitates power delivery to one or more portions of the unmanned vehicle 200 to provide, for example, sustained flight and/or functionality for various components of the unmanned vehicle 200. Examples of implementations of power unit 208 may include a rechargeable battery, an array of rechargeable batteries, and/or fuel cells. To provide additional examples, power unit 208 may be implemented as a fuel tank that holds a suitable type of fuel to provide the unmanned vehicle 200 with its power needs, such as gasoline, propane, diesel fuel, etc. In aspects in which power unit 208 is implemented as a fuel storage tank as opposed to a battery system, power unit 208 may also include suitable power converters to convert the consumption of fuel to electrical power such that electrical power may be provided to the various components of the unmanned vehicle 200.

Servo control unit 210 may be configured to control one or more actuators or other suitable maneuvering components to steer and otherwise navigate the unmanned vehicle 200. As will be appreciated by those of ordinary skill in the relevant art(s), servo control unit 210 may implement any suitable type of servo control based upon a particular actuator (or set of actuators) that is implemented by the unmanned vehicle 200. For example, servo control 210 may implement a proportional-integral-derivative (PID) feedback system to control one or more actuators and may utilize pulse width modulation (PWM) signals, for example, to control these actuators. Examples of actuators may include propellers, rotary systems, rudder controls, aileron control, elevator control, etc. Servo control unit 210 may be configured to receive control commands from CPU 202 to affect the speed, direction, and/or altitude of the unmanned vehicle 200.

Cargo bay 212 may be configured to provide storage space for UAV 200. As will be further discussed below, the unmanned vehicle 200 may deliver various supplies in various aspects. Cargo bay 212 may provide a storage area for such supplies to be stored during flight prior to delivery of these supplies. Cargo bay 212 may be insulated or environmentally controlled to protect the supplies carried from the elements during flight. Furthermore, cargo bay 212 may include one or more bay portions such that different types of cargo may be carried in each of the different portions. Cargo bay 212 may include any suitable number of actuators that may be controlled to deploy the carried cargo. For example, servo control 210 may cause one or more cargo bay doors associated with cargo bay 212 to open and to deploy supplies carried by the unmanned vehicle 200.

Sensor array 214 may be configured to collect information in accordance with any suitable number of implemented sensors. Sensor array 214 may include sensors, for example, that detect one or more parameters and/or perform various functions associated with odor detection, temperature measurements, biometric information detection, smoke detection, sound detection, light detection, radio frequency signal detection and/or radio frequency signal determination, explosives detection, humidity detection, ground moisture detection, thermal imaging, etc., and may include sensors such as magnetometers, ground penetrating radar, three dimensional laser scanners, solid structure (e.g., subterranean) penetrating imaging sensors, LiDAR sensors, sonar sensors, etc.

Power recharge unit 216 may be configured to replenish, recharge, and/or resupply power unit 208 with an appropriate type of power and/or fuel. For example, in aspects in which power unit 208 is implemented as a battery, power recharge unit 216 may include any suitable number of rectifiers, couplers, transformers, etc., to convert received power and to recharge the batteries of the unmanned vehicle 200. To provide another example, in aspects in which power unit 208 is implemented as a fuel tank, power recharge unit 216 may include any suitable number of nozzles, valves, flow control devices, etc., to regulate fuel flow and to refill the fuel tanks of the unmanned vehicle 200.

Instrument bay 218 may be configured to store any suitable number of instruments to collect data for the unmanned vehicle 200 in accordance with a particular application. For example, instrument bay 218 may store specialized instrumentation that may not be included as part of sensor array 214. This could be, for example, when the specialized equipment is too large, when the specialized equipment is too expensive to mass produce for each UAV, etc. In this way, the unmanned vehicle 200 may carry specialized equipment in instrument bay 218 for application that require it and otherwise not utilize the specialized equipment. As will be appreciated by those of ordinary skill in the relevant art(s), the unmanned vehicle 200 may carry a specific number and type of specialized equipment in instrument bay 218 depending on the particular function that the unmanned vehicle 200 is to partake. Examples of equipment carried in instrument bay 218 may include, for example, soil sample extractors (e.g., coring tools), spectrometers, volumetric water content sensors, specialized biometric sensors, soil-testing equipment, specialized imaging equipment, etc.

Communications unit 220 may be configured to facilitate data communications between the unmanned vehicle 200 and one or more other devices, such as one or more unmanned vehicles 102, computing devices 106 and/or central monitoring server 108, for example, as shown in FIG. 1. To provide another example, communications unit 220 may be configured to facilitate communications between the unmanned vehicle 200 and any suitable device via network 104, such as receiving satellite communications, for example. In the present aspect, communications unit 220 may be configured to send data, which may include data collected via sensor array 214, for example, to one or more devices via network 104.

Communications unit 220 may be configured to communicate with one or more device via network 104 to facilitate communications between two or more devices. For example, communications unit 220 may connect to a backup cellular system via network 104 to support cellular communications for devices in the proximity of the unmanned vehicle 200. Base stations or other access points communicating with communications unit 220 to support this functionality are not shown in FIG. 1 for purposes of brevity.

Communication unit 220 may be configured to communicate with one or more satellites to acquire a location of UAV in accordance with a suitable global navigation satellite system (GNSS) protocol, such as a global positioning system (GPS), GLONASS, Galileo, etc.

In one aspect, communications unit 220 may be configured to receive data, such as control commands from one or more other UAVs (e.g., UAVs 102.1-102.N (as shown in FIG. 1) and/or from one or more other devices (e.g., computing devices 106 and/or central monitoring server 108). For example, communications unit 220 may receive commands from one or more of computing devices 106 to affect a flight path of the unmanned vehicle 200, maneuver the unmanned vehicle 200, execute one or more actions, take images, etc., based upon these received commands.

As will be appreciated by those of ordinary skill in the relevant art(s), communications unit 220 may be implemented with any combination of suitable hardware and/or software to enable these functions. For example, communications unit 220 may be implemented with any number of wireless transceivers, network interfaces, physical layers (PHY), etc.

Image capture unit 222 may be configured to capture one or more images, which may include digital images and/or video data, for example. Image capture unit 222 may be coupled to one or more servos that are controlled via servo control unit 210 to obtain images from one or more locations. Image capture unit 222 may include any suitable number of cameras, which may include cameras that capture image data in both the visible and the non-visible spectrum, such as digital and thermal imaging cameras, for example. Image capture unit 222 may be configured to store image data to any suitable potion of memory 226.

Communications unit 220 may be configured to send image data captured by image capture unit 222 to another device, such as one or more UAVs 102, computing devices 106 and/or central monitoring server 108, for example, as shown in FIG. 1.

Action execution implementation unit 224 may include any suitable number of actuators, deployment systems, and/or equipment configured to execute an action in accordance with a function performed by the unmanned vehicle 200. Examples of the equipment included as part of action execution implementation unit 224 may include drills, shovels, beacons, sandbags, firefighting equipment, barricades, barriers to redirect water flow, flares, smoke generating systems, tethers, signaling systems, crowd-control measures, etc. Examples of systems implemented in accordance with the equipment included as part of action execution implementation unit 224 may include any suitable type of deployment system associated with the equipment that is used for a particular application, such as mounts, lifts, doors, nozzles, chutes, tubing, winches, etc. This equipment and their associated actions will be further discussed herein.

Navigation module 228 may be a portion of memory 226 configured to store instructions, that when executed by CPU 202 and/or GPU 204, cause CPU 202 and/or GPU 204 to control the speed, direction, route, and/or altitude of UAV 200 via interaction with servo control unit 210. For example, executable instructions stored in navigation module 228 may enable CPU 202 to determine a location of the unmanned vehicle 200 via satellite communications received via communications unit 220, to route UAV 200 to another location, and to interact with servo control 210 to maneuver the unmanned vehicle 200 to the routed location.

Action execution module 230 may be a portion of memory 226 configured to store instructions, that when executed by CPU 202 and/or GPU 204, cause CPU 202 and/or GPU 204 to perform a particular action based upon a function which the unmanned vehicle 200 is to enact. For example, if action execution implementation unit 224 includes firefighting equipment and nozzles configured to deliver water or other fire suppressant, then execution of instructions stored in action execution module 230 may result in the unmanned vehicle 200 directing and delivering the fire suppressant in accordance with a received control command. As will be appreciated by those of ordinary skill in the relevant art(s), action execution module 230 may include instructions that are tailored or otherwise customized for a particular application in which the unmanned vehicle 200 is utilized.

Analysis module 232 may be a portion of memory 226 configured to store instructions, that when executed by CPU 202 and/or GPU 204, cause CPU 202 and/or GPU 204 to perform a particular analysis based upon the desired data which the unmanned vehicle 200 is to obtain. For example, if action execution implementation unit 224 includes soil sample extraction equipment and instrument bay 218 includes a volumetric water content sensor, then execution of instructions stored in analysis module 232 may result in UAV 200 testing a soil sample with a volumetric water content sensors to obtain a soil water content analysis. As will be appreciated by those of ordinary skill in the relevant art(s), analysis module 232 may include instructions that are tailored or otherwise customized for a particular application in which UAV 200 is utilized.

Various aspects are provided throughout the present disclosure that refer to the actions that may be performed by an unmanned vehicle, such as the unmanned vehicle 200, for example, in response to received commands. As will be appreciated by those or ordinary skill in the relevant art(s), these aspects include unmanned vehicles performing some, or all, of these actions autonomously. For example, although an unmanned vehicle may initially receive a command to find and follow a vehicle matching a specific license plate or other type of image, the unmanned vehicle may, once the vehicle has been identified, further track the vehicle without the need to receive further commands. The amount of and extent of this automation may be customized based upon safety considerations, the complexity of the action performed by the unmanned vehicle, environmental factors, etc.

Furthermore, unmanned vehicles are described throughout the disclosure as being dispatched, deployed, or otherwise instructed to travel to one or more locations to perform various functions. As will be appreciated by those of ordinary skill in the relevant art(s), unmanned vehicles may be instructed to navigate to a specific location via any suitable techniques, such as referencing a postal address, a landmark, a location received in terms of latitude and longitude coordinates, etc. When an unmanned vehicle is instructed to navigate to a geographic location and/or to perform various functions associated with a geographic location, the geographic location may defined in any suitable manner, such as a geofenced coordinate boundary, for example. Regardless of the specific purpose of the information collected by as unmanned vehicle as further provided below, an unmanned vehicle may receive instructions, collect information, execute various actions, store information, and/or transmit collected information in any suitable manner.

Although unmanned vehicles are described throughout the disclosure as often collecting information aerially, aspects include unmanned vehicles using any suitable form of locomotion, such as subterranean, along the ground, underwater, on top of water, etc. As will be appreciated by those of ordinary skill in the relevant art(s), the unmanned vehicles may implement any suitable form of transport that may be preferable for the particular type of data to be collected. For example, if a sewer system is to be assessed, then an unmanned vehicle may be configured to roll through sewer pipes rather than fly through them.

Furthermore, throughout the disclosure, functions to be performed by one or more unmanned vehicles may be explained as being performed by a single unmanned vehicle, such as the unmanned vehicle 200, for example, for purposes of brevity. In the aspects described herein, any described aspects may be performed by a single unmanned vehicle or any suitable number of additional unmanned vehicles. As will be appreciated by those of ordinary skill in the relevant art(s), the number of unmanned vehicles used to perform a particular task may be based upon the size of the task, the processing power needed to perform a task, the time-sensitive nature of the task to be performed, etc.

In addition, throughout the disclosure, various aspects of implementing unmanned vehicles are described in a variety of ways. Some of these aspects include collecting information to mitigate risk and/or prevent loss for insurers by supplying an insurer with images or other types of data to appropriately assess the current and/or future risks posed to insured property. However, unmanned vehicles themselves may also be insured by any suitable type of insurance policy, such as a personal articles policy, for example. As such, even though several examples of data collected by unmanned vehicles described throughout the disclosure use a home as the insured property, the insured property may be any suitable type of property, including other unmanned vehicles.

In some aspects, the various unmanned vehicle functions may be performed by unmanned vehicles maneuvering with or without a tethered system. For example, in some aspects, one or more unmanned vehicles may fly untethered to carryout various functions. In other aspects, however, one or more unmanned vehicles may utilize a tethering system while flying (or other means of locomotion) within a radius governed by the length of the tether. Such tethering systems may be particularly useful, for example, when higher power requirements are required, such that one or more unmanned vehicles may receive power via the tether instead of draining their respective internal batteries. The unmanned vehicle 200 may include additional, fewer, or alternate actions, including those discussed elsewhere herein.

III. Central Monitoring Server Overview

Figure 3:
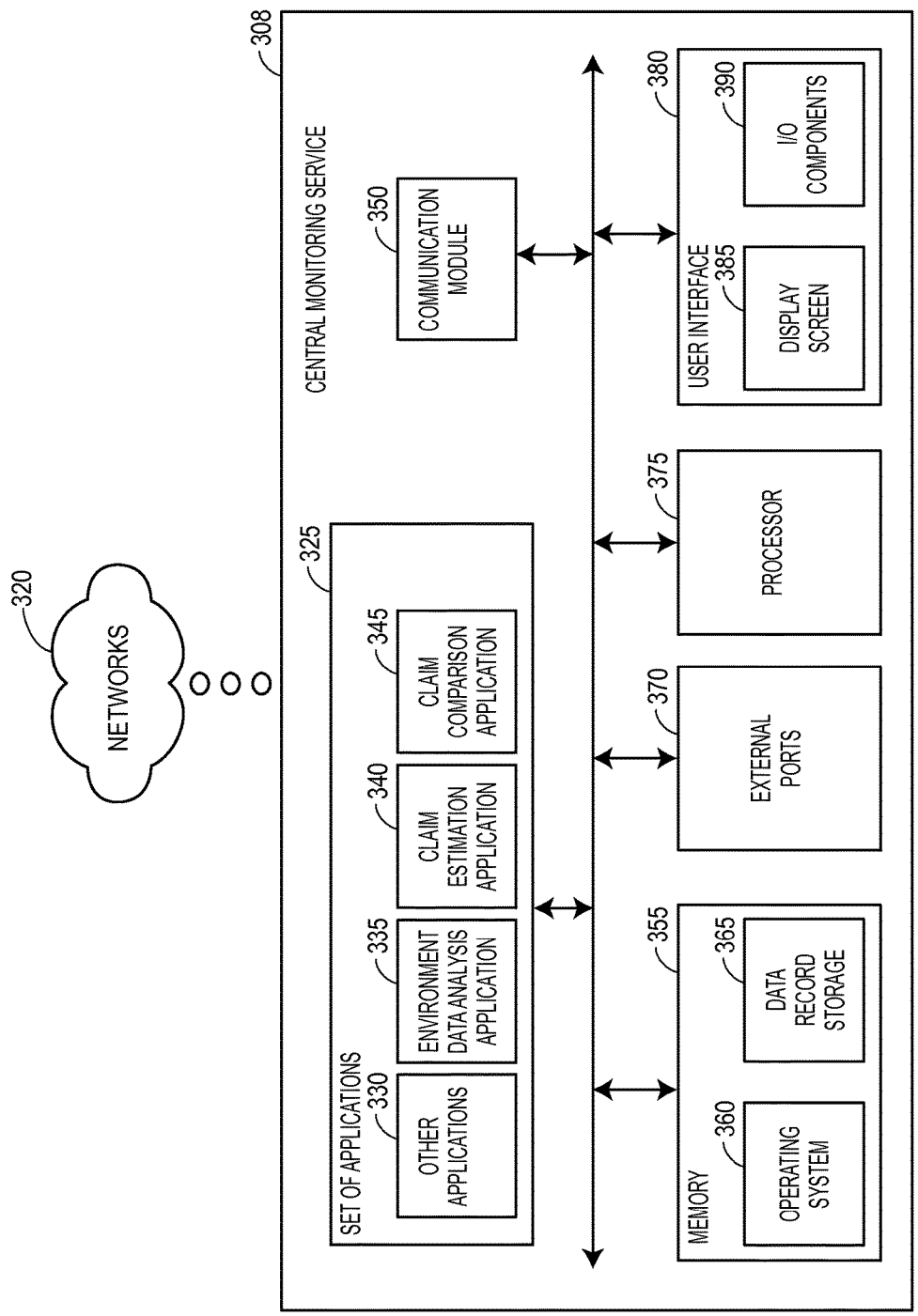
FIG. 3 depicts an exemplary block diagram of a central server in accordance with some embodiments.

FIG. 3 illustrates an exemplary block diagram of a central monitoring server 308 (such as the central monitoring server 108) in which the functionalities as discussed herein may be implemented. It should be appreciated that the central monitoring server 308 may be associated with an insurance provider, as discussed herein.

The central monitoring server 308 may include a processor 375, as well as a memory 355. The memory 355 may store an operating system 360 capable of facilitating the functionalities as discussed herein as well as a set of application 325 (i.e., machine readable instructions). For instance, one of the set of applications may be an environment data analysis application 335 which may be configured to collect and process environment data, which may be collected by one or more unmanned vehicles, such as the unmanned vehicle 200. Another application may be a claim estimation application 340, which may be configured to use data such as the processed or analyzed environment data to calculate various estimated insurance claims. As a further example, another application may be a claim comparison application 345 which may be configured to compare estimated claims, such as the estimated claims generated by the claim estimation application 340, to actual submitted claims in order to detect potential buildup included in the actual submitted claims. It should be appreciated that other applications 330 are envisioned, such as a fraud investigation application configured to assist a user in investigating an actual insurance claim for potential fraud.

The processor 375 may interface with the memory 355 to execute the operating system 360 and the set of applications 325. According to some embodiments, the memory 355 may also include a data record storage 365 that stores various information associated with customer insurance policies or previously actual insurance claims as well as environmental data which may be collected by an unmanned vehicle such as the unmanned vehicle 200. The environment data analysis application 335 may interface with the data record storage 365 to store environment data and/or to retrieve relevant information that the environment data analysis application 335 may use in processing environment data. Further, the claim estimation application 340 may interface with the data record storage 365 to retrieve relevant information that the claim estimation application 340 may use in determining or calculating estimated insurance claims. Further, the claim comparison application 345 may interface with the data record storage 365 to retrieve relevant information that the claim comparison application 345 may use in comparing estimated claims to submitted claims in order to detect potential buildup. The memory 355 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The central monitoring server 308 may further include a communication module 350 configured to communicate data via one or more networks 320. According to some embodiments, the communications module 350 may include one or more transceivers (e.g., WWAN, WLAN, and/or WPAN transceivers) functioning in accordance with IEEE standards, 3GPP standards, or other standards, and configured to receive and transmit data via one or more external ports 370. For instance, the communication module 350 may transmit, via the network 320, environment data that may have been captured by an unmanned vehicle such as the unmanned vehicle 102.1 to the memory 355.

The central monitoring server 308 may further include a user interface 380 configured to present information to a user and/or receive inputs from the user. The user interface 380 may include a display screen 385 and I/O components 390 (e.g., ports, capacitive or resistive touch sensitive panels, keys, buttons, lights, LEDs, speakers, microphones). According to some embodiments, the user may access the central monitoring server 308 via the user interface 380 to review actual insurance claims for potential buildup. In some embodiments, the central monitoring server 308 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 375 (e.g., working in connection with the operating system 360) to facilitate the function as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

IV. Signal Diagram Overview

Figure 4:
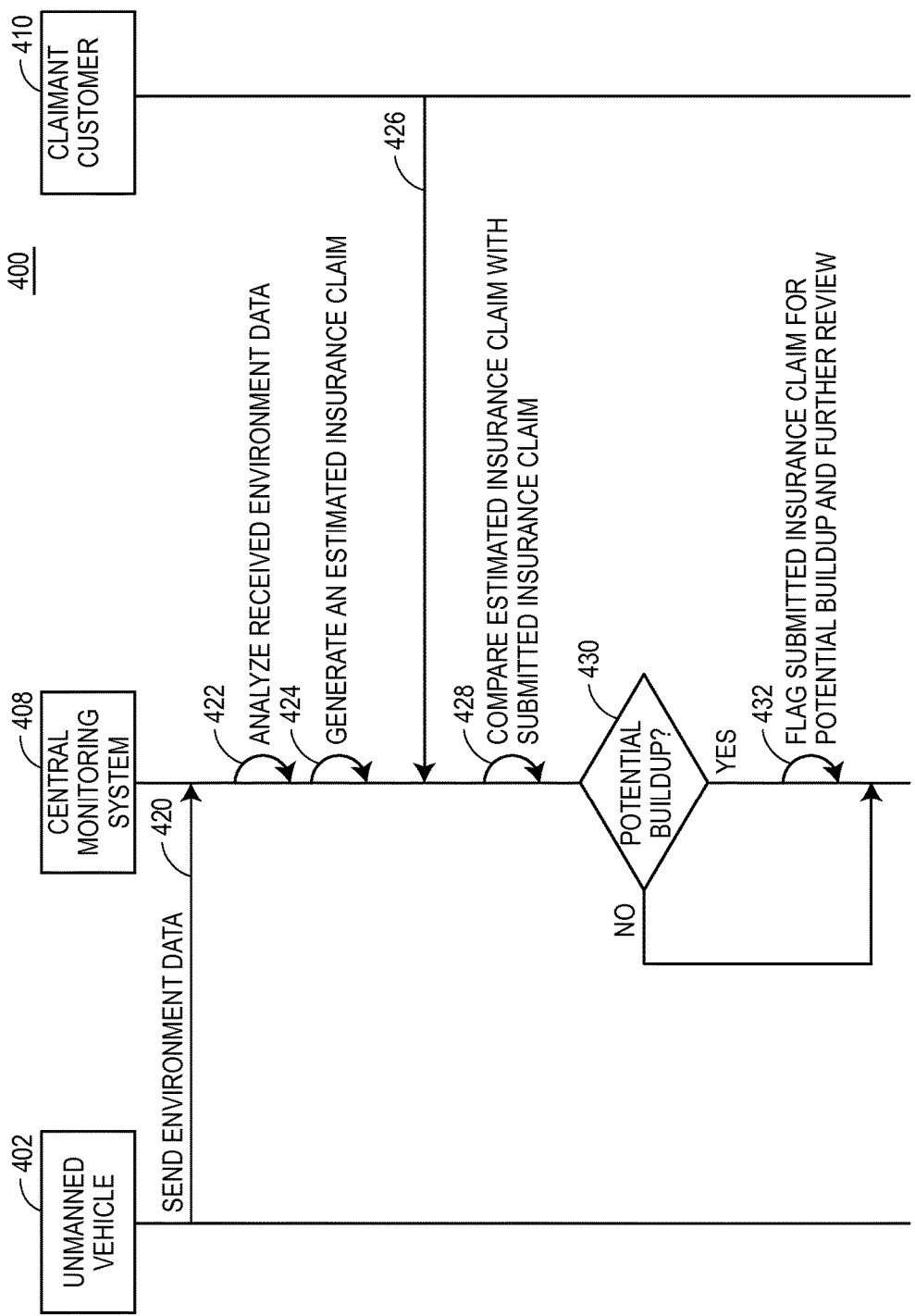
FIG. 4 depicts an exemplary signal diagram associated with comparing an estimated insurance claim generated from received environment data with an actual insurance claim from a claimant individual in order to identify potential buildup, in accordance with some embodiments.

FIG. 4 depicts a signal diagram 400 associated with comparing estimated insurance claims generated from received environment data with an actual insurance claim submitted by a claimant individual in order to identify potential insurance claim buildup. The signal diagram 400 of FIG. 4 includes at least one unmanned vehicle 402 (such as the unmanned vehicle or 200 as discussed with respect to FIG. 1), a central monitoring server 408 (such as the central monitoring server 108 as discussed with respect to FIG. 1) and a claimant individual 410. The claimant individual 410 may be an insured individual or an owner of an insured asset (e.g., a vehicle) involved in a loss event.

The signal diagram 400 may begin when the central monitoring server 408 receives (420) environment data from the one or more unmanned vehicles 402. The received environment data may either record, show, capture, indicate, detail or otherwise be associated with an insured asset (such as a vehicle or home) and may be generated, captured, collected or gathered by the one or more unmanned vehicles 402 before, during and/or after a loss event (such as a vehicle collision or hailstorm), where the insured asset may be covered by an insurance policy. In some implementations, the unmanned vehicle 402 may send the environment data in response to specific triggers (e.g., in response to collecting data from a loss event). The central monitoring server 408 may also request environment data from the unmanned vehicle in response to certain triggers (e.g., at specific times of day, and/or in response to information on a collision). In some embodiments, the environment data may be audio data, digital imaging data (e.g., images, videos, and/or 3D scans), location data, and/or information on surrounding conditions, environment, operating parameters, or the like (e.g., speed limits, weather, trajectory).

The central monitoring server 408 may then analyze (422) the received environment data. This analysis may include applying various analysis techniques to the environment data to identify various conditions associated with the insured asset. In embodiments, the conditions may relate to damage due to the loss event, pre-existing damage prior to the loss event, required repairs, location or orientation relative to the road or to other vehicles, operating conditions (e.g., number of passengers, weather, road conditions, traveling speed, other telematics information from before, during and/or after the insurance related event). For example, the central monitoring server 408 may compare one or more images of the insured asset before, during and/or after the loss event to determine or evaluate an extent of damage to the insured asset in relation to the loss event as well as determine any repairs that the insured asset may require.

In some embodiments, where the insured asset is a vehicle, the analysis may include estimating an expected number of passengers in the vehicle and may also include estimating the extent of injuries and type of treatment necessary for the expected number of passengers. For example, the environment data may include one or more images of the one or more vehicles involved in the loss event. The central monitoring server 408 may then analyze the one or more images to count or estimate a number of passengers in the one or more vehicles that were involved in the loss event. In addition or in the alternative, the central monitoring server 408 may also analyze the one or more images to estimate the type of each of the one or more vehicles (e.g., compact sedan, SUV, minivan) to estimate the number of passengers in each of the one or more vehicles involved in the loss event.

The central monitoring server 408 may also analyze historical information on vehicle occupancy to estimate a typical or expected number of passengers for each of the one or more vehicles involved in the loss event. For example, if the loss event is a car collision between a compact sedan and a minivan, the central monitoring server 408 may access historical information on vehicle occupancy for both compact sedans and minivans.

The central monitoring server 408 may then determine that the expected occupancy of a compact sedan may be, for example, two passengers, whereas the expected occupancy for the minivan may be, for example, four passengers. This historical information may include the time of day, the location of the loss event and/or weather or traffic conditions.

In some embodiments, where the insured asset is a vehicle, the analysis may include determining or calculating telematics information associated with the one or more vehicles involved in the loss event before, during and/or after the collision. For example, the environment data may include one or more images of the one or more vehicles involved in the collision. The central monitoring server 408 may then analyze the one or more images to determine telematics information corresponding to one or more of the vehicles involved in the loss event. For example, if the loss event is a collision and the environment data includes video of the collision, the central monitoring server 408 may analyze the video footage and determine or calculate telematics information, such as the speed, direction of travel and/or acceleration of one or more of the vehicles involved in the collision.

In some embodiments, such as if there is a collision, the analysis may also include determining, based upon the environment data, a percentage of fault for the collision for (1) human drivers; (2) autonomous or semi-autonomous vehicles; (3) road conditions; (4) traffic conditions; (5) weather conditions; and/or (6) road construction. For example, the environment data may include one or more images of the one or more insurance assets before, during and/or after the loss event. The central monitoring server 408 may use the one or more images to reconstruct a series of events leading up to the loss event and use the reconstructed series of events to determine a percentage of collision fault for each of the parties or conditions involved. For example, if the collision occurred between two cars in the rain, the central monitoring server may determine that the driver of one car is 50% at fault, the other driver is 25% at fault and the weather conditions are 25% at fault.

The central monitoring server 408 may then generate (424) an estimated insurance claim. In some embodiments, the estimated insurance claim may include an expected total monetary amount for the claim based upon the analysis of the environment data, historical claim data and/or on other relevant estimates or parameters for the loss event. For example, the estimated insurance claim may include estimates of the extent of damage to the vehicle, the estimated repairs for the vehicle, the estimated number of passengers in the vehicle, the estimated injuries to the passengers and/or the estimated treatment necessary for the passengers. The central monitoring server 408 may then use some or all of this information to estimate a total monetary amount for the claim and include that with the other estimates or parameters.

At some point after the occurrence of the loss event, the central monitoring server 408 may receive (426) an actual insurance claim associated with the loss event, where the actual insurance claim may be submitted by the insured or owner of the insured asset associated with the loss event. The actual insurance claim may include a claimed amount of damage from the collision and may also include details on the type of repairs required, number of passengers, the type of treatment the passenger(s) require, and/or other data.

The central monitoring server 408 may then compare (428) the estimated insurance claim with the actual insurance claim and assess whether there is potential buildup in the actual insurance claim 430). For example, this comparison may include comparing a total monetary amount of the actual insurance claim with the total monetary amount in the estimated insurance claim. If the total monetary amount of the actual insurance claim exceeds the total monetary amount in the estimated insurance claim by a pre-determined threshold amount or percentage, then the central monitoring server 408 may determine that there is potential buildup in the actual insurance claim.

In other embodiments, the central monitoring server 408 may compare a type of repair(s) included in the actual insurance claim with the types of repairs in the estimated insurance claim. If the type of repairs in the actual insurance claim differ from those in the estimated insurance claim by a certain predetermined threshold amount or percentage, then the central monitoring server 408 may determine that there is potential buildup in the actual insurance claim.

In other embodiments, such as where the insured asset is a vehicle, the central monitoring server 408 may compare the number of passengers in the actual insurance claim with the number of passengers in the estimated insurance claim. If the actual number of passengers is larger than the expected number of passengers by a certain predetermined threshold amount or percentage, then the central monitoring server 408 may determine that there is potential buildup in the actual insurance claim.

In other embodiments, such as where the insured asset is a vehicle, the central monitoring server 408 may compare the types of treatment for the one or more passengers indicated in the actual insurance claim with the types of treatment in the estimated insurance claim. If the types of treatment in the actual insurance claim differ from those in the estimated insurance claim by a certain predetermined threshold amount or percentage, then the central monitoring server 408 may determine that there is potential buildup in the actual insurance claim.

If the central monitoring server 408 determines that there is potential buildup in the actual insurance claim ("YES"), then the central monitoring server 408 may flag (432) the actual insurance claim for potential buildup and further review. In some embodiments, the further review may include processing by a fraud investigations team associated with an insurance company. In other embodiments, the further review may include updating or modifying the actual insurance claim and sending it to the claimant individual for review. For example, the updated insurance claim may include a reduced total monetary amount to match that of the estimated insurance claim in order to remedy any potential buildup. The central monitoring server 408 may also notify the claimant individual that the actual insurance claim is flagged for potential buildup.

If the central monitoring server 408 determines that there is no potential buildup in the actual insurance claim ("NO"), then the central monitoring server 408 may continue to process the actual insurance claim according to ordinary insurance practices.

V. Flowchart Overview

Figure 5:
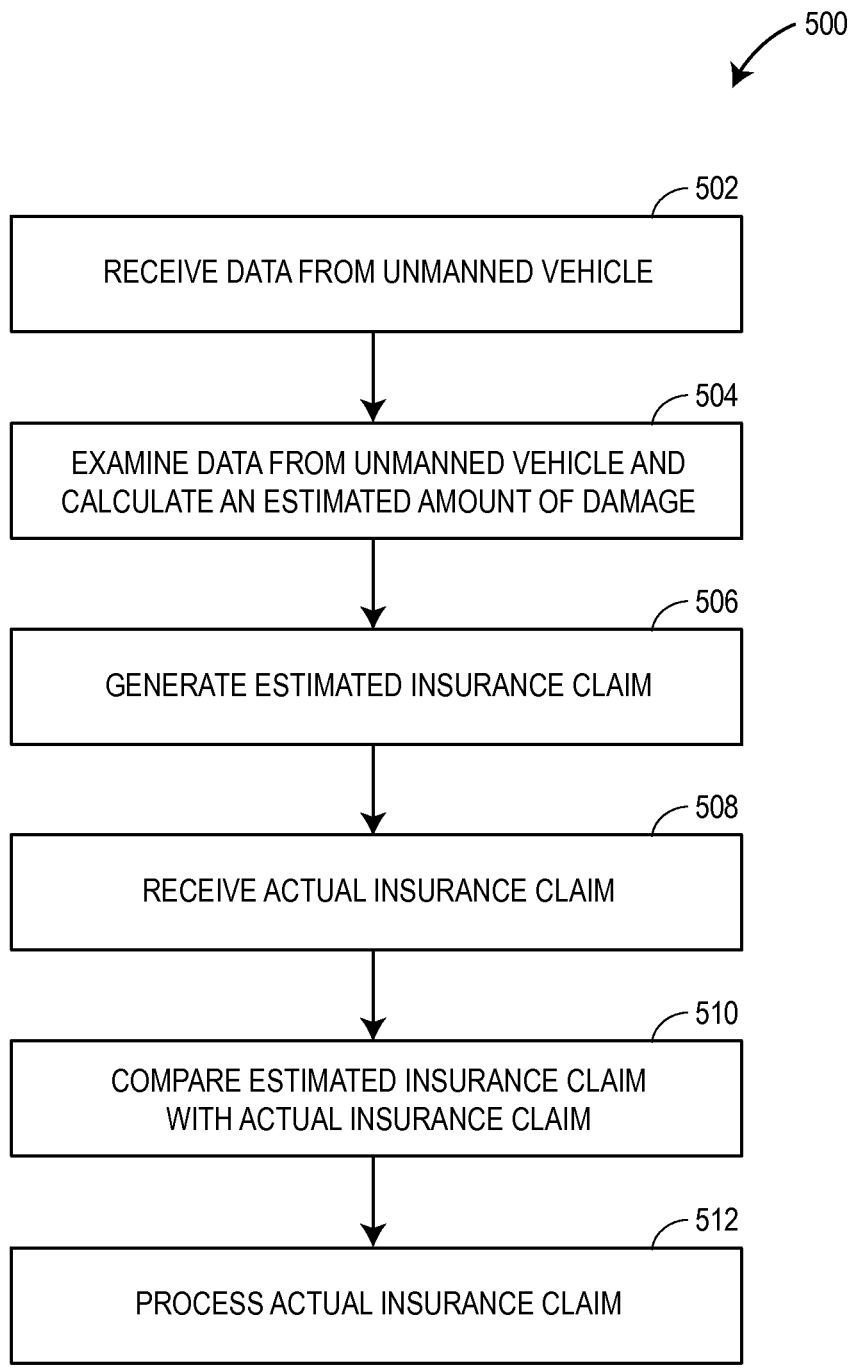
FIG. 5 depicts a flow diagram of an exemplary method of fraudulent claim or buildup identification using environment data, in accordance with some embodiments.

FIG. 5 depicts a flow diagram of an exemplary computer-implemented method 500 of fraudulent claim or buildup identification using environment data. The method 500 may be performed by a central monitoring server, such as the central monitoring server 308 that may be in direct or indirect communication with an insurance provider or a remote processor or server thereof.

The method 500 may begin at block 502 when the central monitoring server receives data, such as environment data, from an unmanned vehicle. The received environment data may record, show, capture, indicate, detail, and/or otherwise be associated with an insured asset (such as a vehicle or home) and may be generated, captured, collected or gathered by the one or more unmanned vehicles, such as a drone, before, during and/or after a loss event (such as a car collision or hailstorm), where the insured asset may be covered by an insurance policy. The environment data may include at least one of image data, video data and audio data detected by the at least one unmanned vehicle. In some implementations, the unmanned vehicle may send the environment data in response to specific triggers (e.g., in response to collecting data from a loss event).

The central monitoring server may then examine (block 504) the data from the unmanned vehicle and calculate an estimated amount of damage. In some embodiments, the central monitoring server may analyze the data from the at least one unmanned vehicle and identify one or more conditions associated with the insured asset. For example, depending upon the type of insured asset, the one or more conditions may include damage to the insured asset due to the loss event, pre-existing damage to the insured asset prior to the loss event, required repairs for the insured asset, location of the insured asset, orientation of the insured asset relative to a roadway and operating conditions at the time of the loss event. Further, where the insured asset is a vehicle, the central monitoring server may also identify at least one of an expected type of vehicle, expected number of passengers, expected injuries and expected types of medical treatment. In some embodiments, where the insured asset is a vehicle, the central monitoring server may also access or retrieve telematics information corresponding to the insured asset during and/or prior to the loss event. For example, the central monitoring server may analyze video of the loss event and may determine or calculate at least one of the speed, acceleration, location and/or direction of travel of the insured asset.

Additionally, the central monitoring server may also determine a percentage fault for the loss event for at least one of human drivers, autonomous or semi-autonomous vehicles, road conditions, traffic conditions, weather conditions and road construction. For example, where the loss event is a vehicle collision between a moving vehicle and a stationary vehicle in bad weather (such as snow or rain), the central monitoring server may determine that the weather was 30% at fault, the driver of the stationary vehicle was 0% at fault and the driver of the moving vehicle was 70% at fault.

The central monitoring server may then generate (block 506) an estimated insurance claim based, at least in part, on the data from the unmanned vehicle. In some embodiments, the estimated insurance claim may include at least one of an estimated total monetary claim amount, an estimated total repair amount and an estimated total medical treatment amount. The central monitoring server may access historical data associated with previously-submitted insurance claims and generate the estimated insurance claim for the loss event based upon the estimated amount of damage resulting from the loss event and the historical data. For example, the central monitoring server may calculate an estimated claim amount or estimated repair total, at least partially, by analyzing the damage to the insured asset before and after the loss event, the expected required repairs and/or the expected types of vehicles. The central monitoring server may additionally compare the damage to the insured asset before and after the loss event with previously-submitted insurance claims for similar insured assets with similar damage to calculate the expected claim amount or estimated repair total. As another example, the estimated medical treatment amount may be based upon at least one of the expected number of passengers, the expected injuries and the expected types of medical treatment.

The central monitoring server may then receive (block 508) an actual insurance claim. The actual insurance claim may be submitted by a claimant individual or another party associated with the loss event, and may identify the insured asset that was involved in the loss event.

The central monitoring server may then compare (block 510) the estimated insurance claim generated in block 506 with the actual insurance claim received in block 508. In some embodiments, the central monitoring server may compare one or more fields of the estimated insurance claim with the corresponding fields of the actual insurance claim. For example, the central monitoring server may compare the total monetary amount of the estimated insurance claim with the total monetary amount of the actual insurance claim. The central monitoring server may also compare other fields such as, for example, total repair amount, type of repairs, total medical treatment amount, number of passengers and type of medical treatment. If the fields of the estimated insurance claim and the actual insurance claim differ by a certain predetermined threshold amount or percentage, the central monitoring server may identify potential buildup. For example, if the estimated insurance claim indicates a total monetary amount of $2000 and the actual insurance claim indicates a total monetary claim of $4000 (for a difference of $2000), the central monitoring server may classify the difference of $2000 as potential buildup that is included in the actual insurance claim. As a further example, if the estimated insurance claim indicates an expected type of medical treatment for scrapes and bruises and the medical treatment included in the actual insurance claim includes multiple visits to a chiropractor and pain treatment, the central monitoring server may identify potential buildup in the actual insurance claim.

The central monitoring server may then process (block 512) the actual insurance claim based upon any identified potential buildup. In particular, if the central monitoring server identified potential buildup in the actual insurance claim, the central monitoring server may flag the actual insurance claim for further review, forward the actual insurance claim to a fraud investigations team associated with an insurance company, and/or deny the actual insurance claim, depending on one or more insurance processing policies. Further, if the central monitoring server does not identify any potential buildup included in the actual insurance claim, then the central monitoring server may approve the actual insurance claim.

VI. User Interface Overview

FIG. 6A depicts an exemplary user interface 600 associated with processing an actual insurance claim flagged for potential buildup by a certain entity, such as a fraud investigations team associated with an insurance company. An electronic device (e.g., a computer, tablet computer or smartphone) may be configured to display the exemplary user interface 600 and/or receive selections and inputs via the exemplary user interface 600. For example, the exemplary user interface 600 may be implemented as a dedicated application associated with an insurance provider that is configured to operate on the electronic device that may display the exemplary user interface 600. It should be appreciated that the exemplary user interface 600 is merely an example and that alternative or additional content is envisioned.

FIG. 6A illustrates an exemplary interface 600 including a list of flagged claims 602, a flagged claim summary 612, and a selection 608 for the next steps for processing a selected claim. In particular, the list of flagged claims 602 may include a list of actual insurance claims that have been flagged for potential buildup, such as by the central monitoring server 408. The list of flagged claims 602 may indicate all of the flagged claims, or it may limit the list to only those flagged claims which have been assigned to a certain user (e.g., an insurance fraud investigator). Flagged claims may be removed from the list of flagged claims 602 once review of the claim by a user is complete. In some embodiments, the list of flagged claims 602 may highlight a selected flagged claim 606. This may enable the user to select and review a single flagged claim at a time in greater detail.

As illustrated in FIG. 6A, after the user selects a selected flagged claim 606, the flagged claim summary 612 may display information related to the selected flagged claim 606. In some embodiments, the user interface 600 may depict reasons for flagging the submitted claim 613, which may include records 634 that may detail why a claim was flagged. For example, the records 634 may indicate a reason a claim was flagged 628, an expected entry 630 and/or a submitted entry 632. The reason a claim was flagged 628 may include reasons such as the total claim amount, the total repair amount, the types of repairs, the number of passengers, the types of medical treatment and/or the total medical treatment amount differing from that expected in the estimated claim. The expected entry 630 may include information from the estimated claim that relates to the reason a claim was flagged 628. Similarly, the submitted entry 632 may include information from the submitted claim that relates to the reason a claim was flagged 628. For example, the exemplary entry 634 indicates that one reason for flagging the submitted claim was that the total claim amount submitted differs from an expected amount of the estimated claim. As shown, the expected entry for the total claim amount is $1,000 and the submitted entry for the total claim amount is $8,000.

As depicted in FIG. 6A, some embodiments of the flagged claim summary 612 may display information related to the submitted claim 618. For example, the information related to the submitted claim 618 may include a claim overview 622, insured asset information 624 and/or passenger information 626. The claim overview 622 may include general information about the claim, such as the claim number and/or the total monetary value of the claim. The insured asset information 624 may include general information about one or more insured assets involved in a loss event. For example, if the insured asset is one or more vehicles, the general information may include the make, model, year and/or type (e.g., compact sedan, SUV, minivan) of the one or more vehicles. The insured asset information 624 may also include information on any damage to the one or more insured assets, any repairs to the one or more insured assets and any corresponding total monetary amount for the repairs.

In some embodiments, such as when the insured asset is one or more vehicles and the loss event is a collision, the information on the submitted claim may include passenger information. The passenger information 626 may contain identifying information for individual passengers (e.g., name, address, height, weight, social security number) and may also include the number of passengers in the one or more vehicles. The passenger information 626 may also include information on the injuries sustained by the one or more passengers, the medical treatment for the one or more passengers and/or the total cost of medical treatment for the one or more passengers.

Figure 6B:
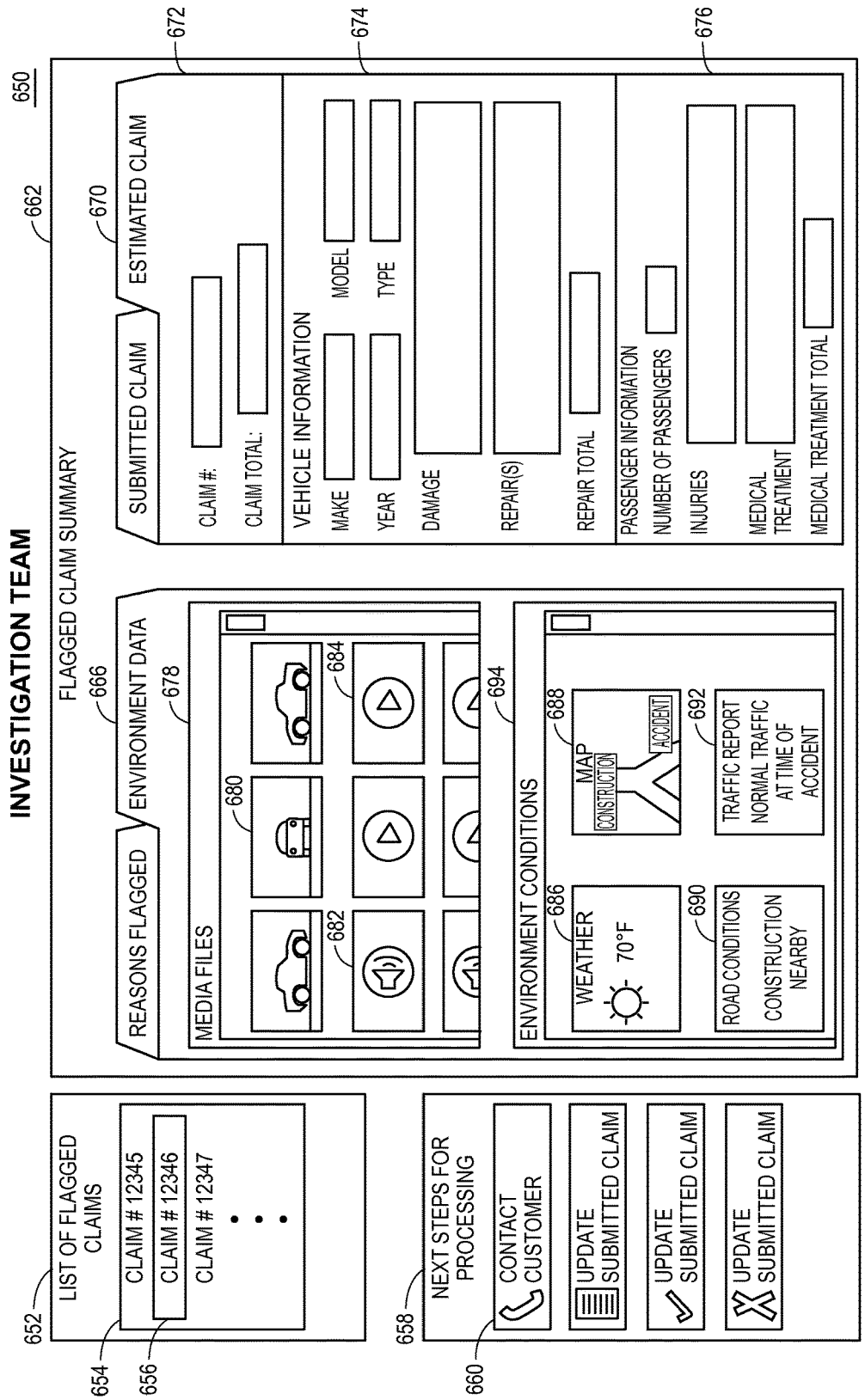

FIG. 6B depicts an exemplary user interface 650 associated with processing an actual insurance claim flagged for potential buildup by a certain entity, such as a fraud investigations team associated with an insurance company. Like the exemplary user interface 600, an electronic device (e.g., a computer, tablet computer or smartphone) may be configured to display the exemplary user interface 650 and/or receive selections and inputs via the exemplary user interface 650. For example, the exemplary user interface 650 may be implemented as a dedicated application associated with an insurance provider that is configured to operate on the electronic device that may display the exemplary user interface 650. It should be appreciated that the exemplary user interface 650 is merely an example and that alternative or additional content is envisioned.

As depicted in FIG. 6B, some embodiments of the flagged claim summary 662 may display information related to the environment data 666 that may have been captured by the one or more unmanned vehicles (such as the unmanned vehicle 200). The environment data 666 may include media files 678 such as image files 680, audio files 682, video files 684 and/or 3D scanner data (not depicted). In some embodiments, the environment data 616 may also include operating condition data 694 such as weather data 686, road conditions

690, traffic reports 692 and/or one or more maps 688. The road conditions 690 may include information on the speed limit of the road near the collision and/or details on nearby construction. The one or more maps 688 may show a summary of where the collision occurred, the locations of any construction and/or a visual depiction of traffic conditions at the time of the collision. It should be appreciated by one skilled in the art that the environment data 666 may include other types of information associated with insured assets and/or a loss event.

As depicted in FIG. 6B, some embodiments may also include information on the estimated claim 670 that may have been generated by the central monitoring server (such as the central monitoring server 108 or 408). For example, the information on the submitted claim 618 may include a claim overview 672, insured asset information 674 and/or passenger information 676. The claim overview 672 may include general information about the claim, such as the claim number and/or the total monetary value of the claim. The insured asset information 674 may include information about one or more insured assets involved in a loss event. For example, if the insured asset is one or more vehicles and the loss event is a collision, the general information may include the make, model, year and/or type (e.g., compact sedan, SUV, minivan) of the one or more vehicles. The insured asset information 674 may also include information related to the damage to the one or more insured assets, the repairs to the one or more insured assets and the total monetary cost of the repairs.

In some embodiments, such as when the insured assets are vehicles and the loss event is a collision, the information on the submitted claim may include passenger information 676 which may include identifying information for individual passengers (e.g., name, address, social security number) and may also include the number of passengers in the one or more vehicles. The passenger information 676 may also include information on any injuries sustained by the one or more passengers, any medical treatment for the one or more passengers and/or the total monetary cost of medical treatment. In some embodiments, a user may then compare the information on the estimated claim 672 with the information on the submitted claim (such as the information on the submitted claim 618) in order to verify that the claim was properly flagged. For example, the user may check the reasons for flagging the claim (such as the reasons for flagging the claim 614) to make sure that the reasons identified are proper (e.g., that the types of repairs/medical treatment actually differ). The user may also inspect the environment data 666 to verify that there is potential buildup. For example, the user may review the environment data 666 and verify whether the information included in the estimated claim 670 is accurate. A user may also determine that the expected total claim amount and/or the expected repair total is too low, and that buildup is not likely because the difference between the submitted amount and the expected amount is no longer above a predetermined threshold.

In some embodiments, the exemplary user interface 650 may also include a selection to initiate the next steps for processing the submitted claim 658. In some embodiments, the selection to initiate the next steps 658 may include selection buttons 660 for the available next steps. For example, the selection buttons 660 may include choices for contacting the customer (e.g., by phone or email), updating the claim and sending the updated claim to the claimant individual (such as the claimant individual 410) for approval, and/or approving the submitted claim or denying the claim. As one skilled in the art will appreciate, there are many other possible next steps that may be included in the selection for the next steps for processing the submitted claim 658. When one of the selection buttons 660 is selected (e.g., by clicking with a computer mouse, or tapping the portion of a touchscreen corresponding to one of the selection buttons 660), the exemplary interface 650 may automatically initiate the action indicated by the selection button 660 (e.g., approving/denying the claim and removing it from the user's list of flagged claims 602), or may provide the user with the information on what to do next (e.g., providing the user with the claimant individual's contact information so that the user may contact the claimant individual).

VII. Exemplary Method

In one aspect, a computer-implemented method of fraudulent claim detection is provided. The method may include (1) receiving, at a server associated with an insurance provider, data detected by at least one unmanned vehicle, the data indicating a loss event involving at least one of an individual and an insured asset; (2) examining, by a processor, the data detected by the at least one unmanned vehicle to calculate an estimated amount of damage resulting from the loss event; (3) generating, by the processor, an estimated insurance claim for the loss event based upon the estimated amount of damage resulting from the loss event; (4) receiving, at the server, an actual insurance claim related to the loss event and submitted by a claimant individual; (5) comparing, by the processor, the estimated insurance claim to the actual insurance claim to identify potential buildup included in the actual insurance claim; and/or (6) processing the actual insurance claim based upon the potential buildup. As a result, the insurance provider's ability to detect fraudulent claims and reduce insurance costs for the average consumer is enhanced. The method may include additional, less, or alternate actions, including those discussed elsewhere herein, and/or may be implemented via one or more processors, or via computer-executable instructions stored on non-transitory computer-readable media or medium.

For instance, receiving the data detected by the at least one unmanned vehicle may include receiving at least one of image data, video data, and audio data detected by the at least one unmanned vehicle. Examining the data detected by the at least one unmanned vehicle may include (1) analyzing the data detected by the unmanned vehicle, and (2) based upon the analyzing, identifying at least one condition associated with the insured asset. Further, identifying at least one condition associated with the insured asset may include identifying at least one of: (i) damage to the insured asset due to the loss event, (ii) pre-existing damage to the insured asset prior to the loss event, (iii) a required repair for the insured asset, (iv) a location of the insured asset, (v) an orientation of the insured asset relative to a roadway, and (vi) an operating condition at the time of the loss event.

Examining the data detected by the at least one unmanned vehicle may also include identifying at least one of: (i) an expected type of vehicle, (ii) an expected number of passengers, (iii) at least one expected injury of the passengers, and (iv) at least one expected type of medical treatment for the passengers. Further, examining the data detected by the at least one unmanned vehicle may include (1) accessing telematics information corresponding to at least one operating condition of the insured asset around a time of the loss event; and (2) analyzing the telematics information. Examining the data detected by the at least one unmanned vehicle may also include determining a percentage fault for the loss event for at least one of: (i) at least one human driver, (ii) at least one autonomous or semi-autonomous vehicle, (iii) at least one road condition, (iv) at least one traffic condition, (v) at least one weather condition, and (vi) road construction.

Generating the estimated insurance claim for the loss event may include populating the estimated insurance claim for the loss event with at least one of (i) an estimated total monetary claim amount, (ii) an estimated total repair amount, and (iii) an estimated total medical treatment amount. Generating the estimated insurance claim for the less event may also include (1) accessing historical data associated with previously-submitted insurance claims; and (2) generating the estimated insurance claim for the loss event based upon the estimated amount of damages resulting from the loss event and the historical data.

Comparing the estimated insurance claim to the actual insurance claim to identify the potential buildup included in the actual insurance claim may include (1) comparing at least one field of the estimated insurance claim with at least one corresponding field of the actual insurance claim, the at least one field including at least one of: (i) a total monetary amount, a total repair amount, a type of repair, a total medical treatment amount, a number of passengers, and a type of medical treatment; and (2) identifying the potential buildup if the at least one field of the estimated insurance claim differs from the at least one corresponding field of the actual insurance claim by a predetermined threshold. Processing the actual insurance claim based upon the potential buildup may include processing the actual insurance claim by at least one of: (i) flagging the actual insurance claim for further review, (ii) forwarding the actual insurance claim to a fraud investigations team associated with the insurance provider, and (iii) denying the actual insurance claim.

VIII. Exemplary Server

In one aspect, a central monitoring server for detecting fraudulent claims may be provided. The central monitoring server may include (1) a transceiver adapted to interface with and receive data detected by at least one unmanned vehicle; (2) a memory adapted to store non-transitory computer executable instructions; and/or (3) a processor adapted to interface with the transceiver and the memory, wherein the processor is configured to execute the non-transitory computer executable instructions to cause the processor to: (i) receive, via the transceiver, data detected by the at least one unmanned vehicle, the data indicating a loss event involving at least one of an individual and an insured asset; (ii) examine the data detected by the at least one unmanned vehicle to calculate an estimated amount of damage resulting from the loss event; (iii) generate an estimated insurance claim for the loss event based upon the estimated amount of damage resulting from the loss event; (iv) receive an actual insurance claim related to the loss event and submitted by a claimant individual; (v) compare the estimated insurance claim to the actual insurance claim to identify potential buildup included in the actual insurance claim; and/or (vi) process the actual insurance claim based upon the potential buildup. The device may include additional, less, or alternate functionality, including that discussed elsewhere herein.

For instance, to receive the data detected by the at least one unmanned vehicle, the processor may be configured to receive at least one of image data, video data, and audio data detected by the at least one unmanned vehicle. To examine the data detected by the at least one unmanned vehicle, the processor may be configured to: (1) analyze the data detected by the at least one unmanned vehicle; and (2) based upon the analysis, identify at least one condition associated with the insured asset. To identify the at least one condition associated with the insured asset, the processor may be configured to identify at least one of: (i) damage to the insured asset due to the loss event, (ii) pre-existing damage to the insured asset prior to the loss event, (iii) a required repair for the insured asset, (iv) a location of the insured asset, (v) an orientation of the insured asset relative to a roadway, and (vi) an operating condition at the time of the loss event. To examine the data detected by the at least one unmanned vehicle, the processor may also be configured to identify at least one of: (i) an expected type of vehicle, (ii) an expected number of passengers, (iii) at least one expected injury of the passengers, and (iv) at least one expected type of medical treatment for the passengers.

To examine the data detected by the at least one unmanned vehicle, the processor may also be configured to (1) access telematics information corresponding to at least one operating condition of the insured asset around a time of the loss event; and (2) analyze the telematics information. To examine the data detected the at least one unmanned vehicle, the processor may be configured to determine a percentage fault for the loss event for at least one of: (i) at least one human driver, (ii) at least one autonomous or semi-autonomous vehicle, (iii) at least one road condition, (iv) at least one traffic condition, (v) at least one weather condition, and (vi) road construction.

To generate the estimated insurance claim for the less event, the processor may be configured to populate the estimated insurance claim for the loss event with at least one of: (i) an estimated total monetary claim amount, (ii) an estimated total repair amount, and (iii) an estimated total medical treatment amount. To generate the estimated insurance claim for the loss event, the processor may also be configured to (1) access historical data associated with previously-submitted insurance claims; and (2) generate the estimated insurance claim for the loss event based upon the estimated amount of damage resulting from the loss event and the historical data. To compare the estimated insurance claim to the actual insurance claim to identify the potential buildup included in the actual insurance claim, the processor may be configured to (1) compare at least one field of the estimated insurance claim with at least one corresponding field of the actual insurance claim, the at least one field including at least one of: (i) a total monetary amount, (ii) a total repair amount, a type of repair, (iii) a total medical treatment amount, (iv) a number of passengers, and (v) a type of medical treatment; and (2) identify the potential buildup if the at least one field of the estimated insurance claim differs from the at least one corresponding field of the actual insurance claim by a predetermined threshold. To process the actual insurance claim based upon the potential buildup, the processor may be configured to process the actual insurance claim by at least one of: flagging the actual insurance claim for further review, forwarding the actual insurance claim to a fraud investigations team associated with the insurance provider, and denying the actual insurance claim.

IX. Additional Considerations

With the foregoing, an insurance customer may opt into a rewards, insurance discount, or other type of program. After the insurance customer provides their affirmative consent, an insurance provider drone or UAV may collect image data of insured assets before, during, and/or after an insurance-related event, including those events discussed elsewhere herein. For instance, drone data may be collected before, during, and/or after a vehicle collision or crash, such as with the insured's permission. Actual damage or fault determination may be determined from analysis of the drone data. As a result, risk averse drivers and/or vehicle owners, and/or insureds not at fault for a vehicle collision (or other insurance-related event) may not be unfairly penalized (i) for vehicle collisions or crashes that were not their fault, but rather were caused by another vehicle or driver, or (ii) inflated or fraudulent insurance claims submitted by other drivers or vehicle owners.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, and/or (ii) vehicle operators or passengers.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method of fraudulent claim detection, the method comprising:
    directing, by a server associated with an insurance provider, at least one unmanned vehicle to a location of at least one of an individual or an insured asset to collect data indicating a loss event involving the individual or the insured asset;
    receiving, at the server, the data detected by the at least one unmanned vehicle;
    examining, by a processor, the data detected by the at least one unmanned vehicle to calculate an estimated amount of damage resulting from the loss event;
    generating, by the processor, an estimated insurance claim for the loss event based upon the estimated amount of damage resulting from the loss event;
    receiving, at the server, an actual insurance claim related to the loss event and submitted by a claimant individual;

comparing, by the processor, the estimated insurance claim to the actual insurance claim to identify potential buildup included in the actual insurance claim; and processing the actual insurance claim based upon the potential buildup.

2. The computer-implemented method of claim 1, wherein receiving the data detected by the at least one unmanned vehicle comprises:

receiving at least one of image data, video data, and audio data detected by the at least one unmanned vehicle.

3. The computer-implemented method of claim 1, wherein examining the data detected by the at least one unmanned vehicle comprises:

analyzing the data detected by the at least one unmanned vehicle, and based upon the analyzing, identifying at least one condition associated with the insured asset.

4. The computer-implemented method of claim 3, wherein identifying the at least one condition associated with the insured asset comprises:

identifying at least one of:
damage to the insured asset due to the loss event,
pre-existing damage to the insured asset prior to the loss event,
a required repair for the insured asset,
a location of the insured asset,
an orientation of the insured asset relative to a roadway, and
an operating condition at the time of the loss event.

5. The computer-implemented method of claim 1, wherein examining the data detected by the at least one unmanned vehicle comprises:

identifying at least one of:
an expected type of vehicle,
an expected number of passengers,
at least one expected injury of the passengers, and
at least one expected type of medical treatment for the passengers.

6. The computer-implemented method of claim 1, wherein examining the data detected by the at least one unmanned vehicle comprises:

accessing telematics information corresponding to at least one operating condition of the insured asset around a time of the loss event; and
analyzing the telematics information.

7. The computer-implemented method of claim 1, wherein examining the data detected by the at least one unmanned vehicle comprises:

determining a percentage fault for the loss event for at least one of:
at least one human driver,
at least one autonomous or semi-autonomous vehicle,
at least one road condition,
at least one traffic condition,
at least one weather condition, and
road construction.

8. The computer-implemented method of claim 1, wherein generating the estimated insurance claim for the loss event comprises:

populating the estimated insurance claim for the loss event with at least one of:
an estimated total monetary claim amount,
an estimated total repair amount, and
an estimated total medical treatment amount.

9. The computer-implemented method of claim 1, wherein generating the estimated insurance claim for the loss event comprises:

accessing historical data associated with previously-submitted insurance claims; and
generating the estimated insurance claim for the loss event based upon the estimated amount of damage resulting from the loss event and the historical data.

10. The computer-implemented method of claim 1, wherein comparing the estimated insurance claim to the actual insurance claim to identify the potential buildup included in the actual insurance claim comprises:

comparing at least one field of the estimated insurance claim with at least one corresponding field of the actual insurance claim, the at least one field including at least one of:
a total monetary amount,
a total repair amount,
a type of repair,
a total medical treatment amount,
a number of passengers, and
a type of medical treatment; and
identifying the potential buildup if the at least one field of the estimated insurance claim differs from the at least one corresponding field of the actual insurance claim by a predetermined threshold.

11. The computer-implemented method of claim 1, wherein processing the actual insurance claim based upon the potential buildup comprises:

processing the actual insurance claim by at least one of:
flagging the actual insurance claim for further review, and
forwarding the actual insurance claim to a fraud investigations team associated with the insurance provider.

12. A central monitoring server for detecting fraudulent claims, the system comprising:

a transceiver adapted to interface with and receive data detected by at least one unmanned vehicle;
a memory adapted to store non-transitory computer executable instructions; and
a processor adapted to interface with the transceiver and the memory, wherein the processor is configured to execute the non-transitory computer executable instructions to cause the processor to:
direct the at least one unmanned vehicle to a location of at least one of an individual or an insured asset to collect data indicating a loss event involving the individual or the insured asset;
receive, via the transceiver, the data detected by the at least one unmanned vehicle;
examine the data detected by the at least one unmanned vehicle to calculate an estimated amount of damage resulting from the loss event;
generate an estimated insurance claim for the loss event based upon the estimated amount of damage resulting from the loss event;
receive an actual insurance claim related to the loss event and submitted by a claimant individual;
compare the estimated insurance claim to the actual insurance claim to identify potential buildup included in the actual insurance claim; and
process the actual insurance claim based upon the potential buildup.

13. The central monitoring system of claim 12, wherein to receive the data detected by the at least one unmanned vehicle, the processor is configured to:

receive at least one of image data, video data, and audio data detected by the at least one unmanned vehicle.

14. The central monitoring server of claim 12, wherein to examine the data detected by the at least one unmanned vehicle, the processor is configured to:
- analyze the data detected by the at least one unmanned vehicle; and
- based upon the analysis, identify at least one condition associated with the insured asset.

15. The central monitoring server of claim 14, wherein to identify the at least one condition associated with the insured asset, the processor is configured to:
- identify at least one of:
  - damage to the insured asset due to the loss event,
  - pre-existing damage to the insured asset prior to the loss event,
  - a required repair for the insured asset,
  - a location of the insured asset,
  - an orientation of the insured asset relative to a roadway, and
  - an operating condition at the time of the loss event.

16. The central monitoring server of claim 12, wherein to examine the data detected by the at least one unmanned vehicle, the processor is configured to:
- identify at least one of:
  - an expected type of vehicle,
  - an expected number of passengers,
  - at least one expected injury of the passengers, and
  - at least one expected type of medical treatment for the passengers.

17. The central monitoring server of claim 12, wherein to examine the data detected by the at least one unmanned vehicle, the processor is configured to:
- access telematics information corresponding to at least one operating condition of the insured asset around a time of the loss event; and
- analyze the telematics information.

18. The central monitoring server of claim 12, wherein to examine the data detected by the at least one unmanned vehicle, the processor is configured to:
- determine a percentage fault for the loss event for at least one of:
  - at least one human driver,
  - at least one autonomous or semi-autonomous vehicle,
  - at least one road condition,
  - at least one traffic condition,
  - at least one weather condition, and
  - road construction.

19. The central monitoring server of claim 12, wherein to generate the estimated insurance claim for the loss event, the processor is configured to:
- populate the estimated insurance claim for the loss event with at least one of:
  - an estimated total monetary claim amount,
  - an estimated total repair amount, and
  - an estimated total medical treatment amount.

20. The central monitoring server of claim 12, wherein to generate the estimated insurance claim for the loss event, the processor is configured to:
- access historical data associated with previously-submitted insurance claims; and
- generate the estimated insurance claim for the loss event based upon the estimated amount of damage resulting from the loss event and the historical data.

21. The central monitoring server of claim 12, wherein to compare the estimated insurance claim to the actual insurance claim to identify the potential buildup included in the actual insurance claim, the processor is configured to:
- compare at least one field of the estimated insurance claim with at least one corresponding field of the actual insurance claim, the at least one field including at least one of:
  - a total monetary amount,
  - a total repair amount,
  - a type of repair,
  - a total medical treatment amount,
  - a number of passengers, and
  - a type of medical treatment; and
- identify the potential buildup if the at least one field of the estimated insurance claim differs from the at least one corresponding field of the actual insurance claim by a predetermined threshold.

22. The central monitoring server of claim 12, wherein to process the actual insurance claim based upon the potential buildup, the processor is configured to:
- process the actual insurance claim by at least one of:
  - flagging the actual insurance claim for further review, and
  - forwarding the actual insurance claim to a fraud investigations team associated with the insurance provider.

* * * * *